US007978190B2

(12) United States Patent
Yamazaki et al.

(10) Patent No.: US 7,978,190 B2
(45) Date of Patent: *Jul. 12, 2011

(54) ELECTROOPTICAL DEVICE

(75) Inventors: Shunpei Yamazaki, Tokyo (JP); Jun Koyama, Kanagawa (JP); Yoshiharu Hirakata, Kanagawa (JP); Takeshi Fukunaga, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1002 days.

This patent is subject to a terminal disclaimer.

(21) Appl. No.: 11/889,452

(22) Filed: Aug. 13, 2007

(65) Prior Publication Data

US 2007/0291022 A1 Dec. 20, 2007

Related U.S. Application Data

(62) Division of application No. 10/918,599, filed on Aug. 16, 2004, now Pat. No. 7,256,776, which is a division of application No. 10/135,527, filed on May 1, 2002, now Pat. No. 6,778,164, which is a division of application No. 09/134,546, filed on Aug. 17, 1998, now Pat. No. 6,388,652.

(30) Foreign Application Priority Data

Aug. 20, 1997 (JP) .................................. 9-240507
Sep. 5, 1997 (JP) .................................. 9-257847

(51) Int. Cl.
G09G 5/00 (2006.01)
(52) U.S. Cl. ............. 345/206; 345/87; 345/92; 345/204

(58) Field of Classification Search ............ 345/87–100, 345/204–215; 349/149–152
See application file for complete search history.

(56) References Cited

U.S. PATENT DOCUMENTS

| | | | |
|---|---|---|---|
| 4,470,060 A | 9/1984 | Yamazaki | |
| 4,521,771 A | 6/1985 | Alton | |
| 4,838,654 A | 6/1989 | Hamaguchi et al. | |
| 5,148,301 A | 9/1992 | Sawatsubashi et al. | |
| 5,151,689 A | 9/1992 | Kabuto et al. | |
| 5,426,526 A | 6/1995 | Yamamoto et al. | |
| 5,436,635 A | 7/1995 | Takahara et al. | |
| 5,453,858 A | 9/1995 | Yamazaki | |
| 5,588,025 A | 12/1996 | Strolle et al. | |
| 5,616,944 A | 4/1997 | Mizutani et al. | |
| 5,699,134 A | 12/1997 | Takeda et al. | |
| 5,701,167 A | 12/1997 | Yamazaki | |
| 5,724,110 A | 3/1998 | Majima | |
| 5,736,972 A | 4/1998 | Kitagishi et al. | |
| 5,798,744 A | 8/1998 | Tanaka et al. | |

(Continued)

FOREIGN PATENT DOCUMENTS

EP  0653664  5/1995

(Continued)

*Primary Examiner* — Vijay Shankar
(74) *Attorney, Agent, or Firm* — Eric J. Robinson; Robinson Intellectual Property Law Office, P.C.

(57) ABSTRACT

In an electrooptical device including an electrooptical modulating layer between a first substrate 101 and a second substrate 105, all edges 107 to 109 of the first substrate 101 and the second substrate 105, except an edge where IC chips 110 and 111 are attached, are trued up each other between the first substrate 101 and the second substrate 105. By this, it is possible to make the area of the first substrate 101 minimum.

32 Claims, 21 Drawing Sheets

U.S. PATENT DOCUMENTS

| | | | | |
|---|---|---|---|---|
| 5,798,812 | A | 8/1998 | Nishiki et al. | |
| 5,808,595 | A | 9/1998 | Kubota et al. | |
| 5,808,707 | A | 9/1998 | Niibori et al. | |
| 5,838,412 | A | 11/1998 | Ueda et al. | |
| 5,849,601 | A | 12/1998 | Yamazaki | |
| 5,889,291 | A | 3/1999 | Koyama et al. | |
| 5,903,324 | A | 5/1999 | Lyons et al. | |
| 6,011,607 | A | 1/2000 | Yamazaki et al. | |
| 6,023,075 | A | 2/2000 | Yamazaki | |
| 6,198,133 | B1 | 3/2001 | Yamazaki et al. | |
| 6,252,249 | B1 | 6/2001 | Yamazaki | |
| 6,306,213 | B1 | 10/2001 | Yamazaki | |
| 6,310,651 | B1 | 10/2001 | Mizutome | |
| 6,388,652 | B1 | 5/2002 | Yamazaki et al. | |
| 6,441,399 | B1 | 8/2002 | Koyama et al. | |
| 6,599,791 | B1 | 7/2003 | Koyama et al. | |
| 6,778,164 | B2 | 8/2004 | Yamazaki et al. | |
| 7,023,518 | B1 | 4/2006 | Koyama et al. | |
| 7,067,844 | B2 | 6/2006 | Yamazaki | |
| 7,145,173 | B2 | 12/2006 | Koyama et al. | |
| 7,256,776 | B2 * | 8/2007 | Yamazaki et al. | 345/206 |

FOREIGN PATENT DOCUMENTS

| | | |
|---|---|---|
| EP | 0732681 | 9/1996 |
| JP | 64-048024 | 2/1989 |
| JP | 04-107422 | 4/1992 |
| JP | 05-289053 | 11/1993 |
| JP | 05-347738 | 12/1993 |
| JP | 06-003638 | 1/1994 |
| JP | 07-140488 | 6/1995 |
| JP | 07-282536 | 10/1995 |
| JP | 07-318952 | 12/1995 |
| JP | 08-015730 | 1/1996 |
| JP | 08-030237 | 2/1996 |
| JP | 08-046206 | 2/1996 |
| JP | 08-234221 | 9/1996 |
| JP | 08-248392 | 9/1996 |
| JP | 08-248430 | 9/1996 |
| JP | 08-297268 | 11/1996 |
| JP | 08-297293 | 11/1996 |
| JP | 08-328025 | 12/1996 |
| JP | 09-006290 | 1/1997 |
| JP | 09-045060 | 2/1997 |
| JP | 09-062239 | 3/1997 |
| JP | 09-163261 | 6/1997 |
| JP | 09-171192 | 6/1997 |
| JP | 09-171373 | 6/1997 |
| JP | 10-104561 | 4/1998 |
| JP | 10-307289 | 11/1998 |
| JP | 3874899 | 1/2007 |

* cited by examiner

FIG. 13
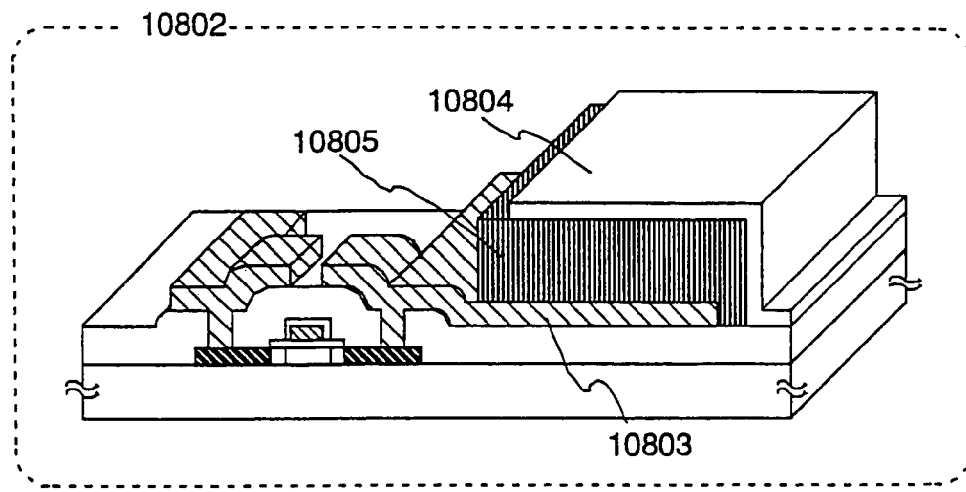
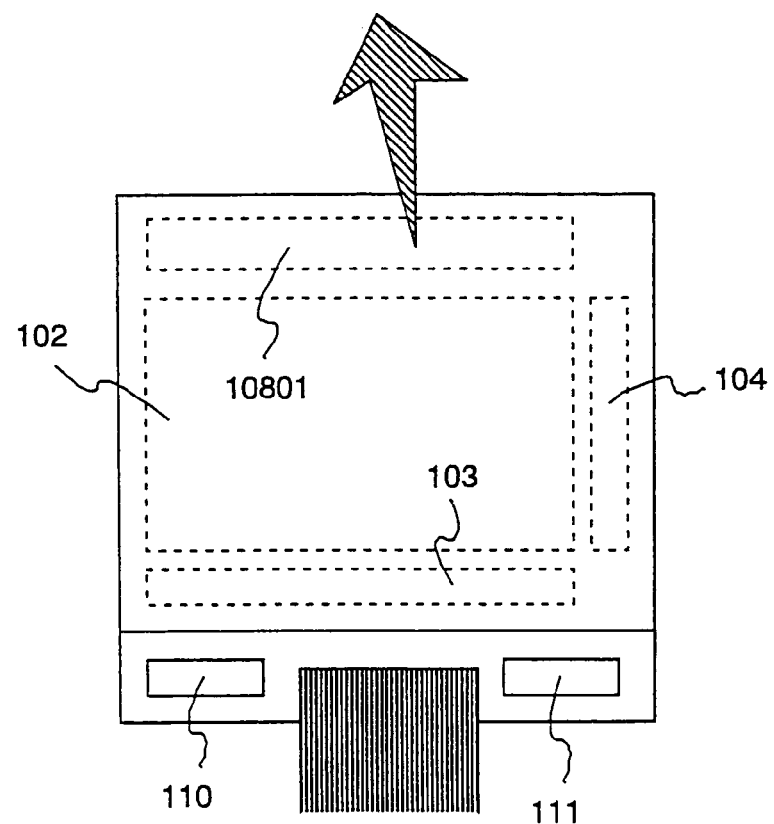

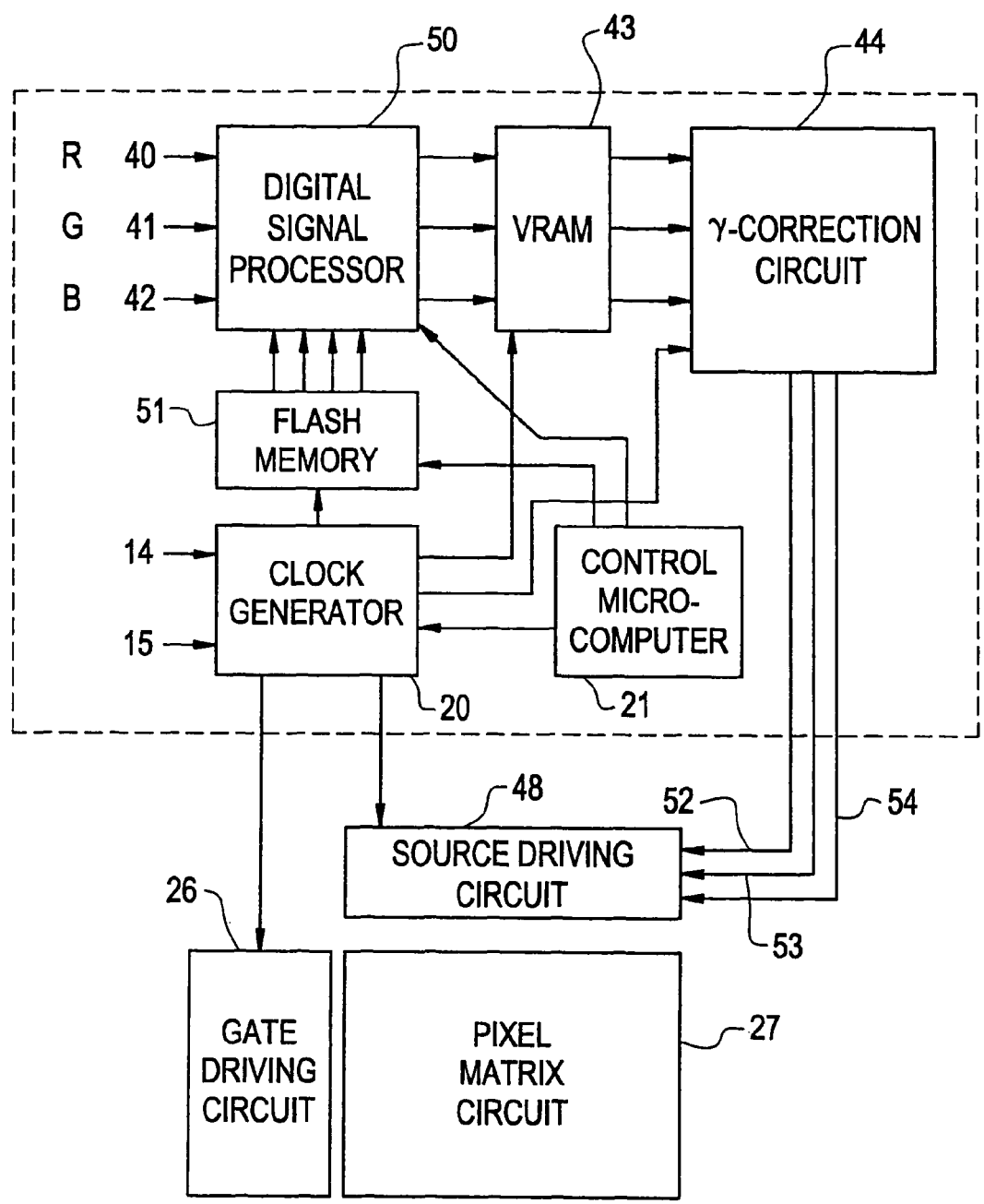

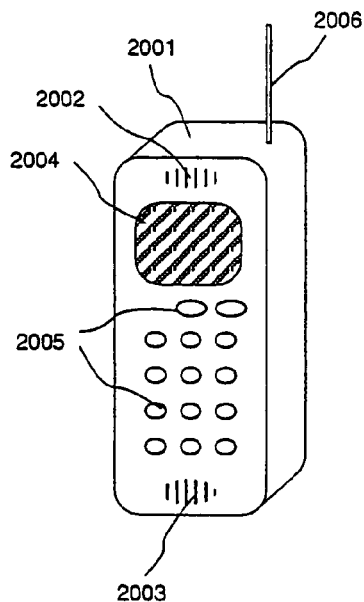
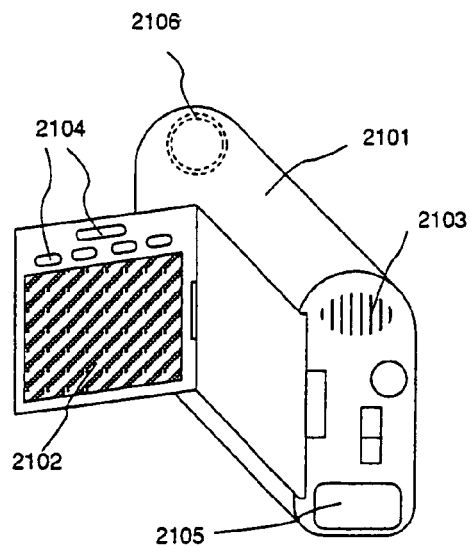
FIG. 22A    FIG. 22B
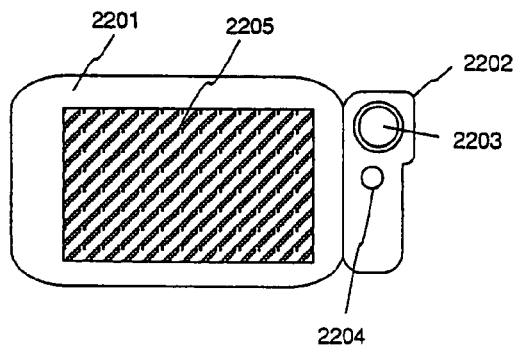
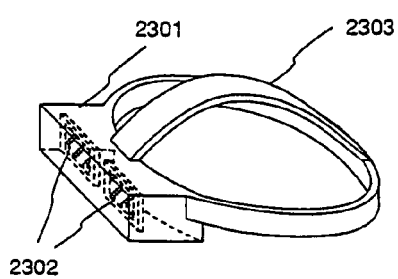
FIG. 22C    FIG. 22D
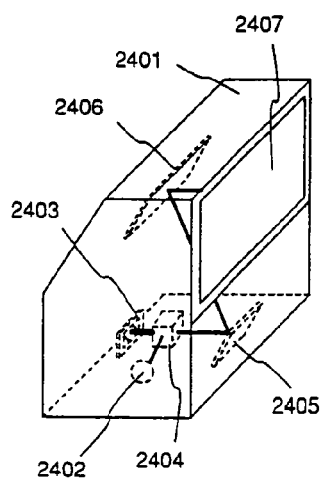
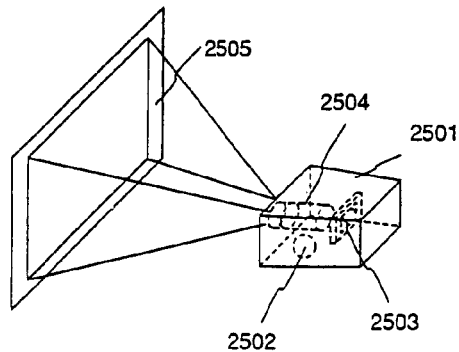
FIG. 22E    FIG. 22F

ELECTROOPTICAL DEVICE

BACKGROUND OF THE INVENTION

1. Field of the Invention

The present invention relates to an electrooptical device comprising thin film transistors formed over an insulating substrate and an IC chip formed over the same substrate, particularly to a structure of an active matrix type liquid crystal display device.

2. Description of the Related Art

In recent years, a technique for forming a thin film transistor (hereinafter referred to as a TFT) of a semiconductor thin film formed over a glass substrate has been developed. Moreover, an electrooptical device in which a voltage applied to an optical modulating layer held between a pair of substrates is controlled by a TFT to carry out an ON/OFF operation of light, has been developed.

Particularly, as a display such as a viewfinder of a video camera or a monitor screen of a note-sized personal computer, the demand for a liquid crystal panel using a liquid crystal as an optical modulating layer is rapidly increasing.

At present, the main current of development is a liquid crystal panel constituted by polysilicon TFTs using crystalline silicon films (typically polysilicon films) as semiconductor thin films. Since the operating speed of the polysilicon TFT is faster than an amorphous silicon TFT, it is possible to form a monolithic liquid crystal panel in which a pixel matrix circuit and a driving circuit (shift register and the like) are formed on the same substrate.

Further, it is desired to realize a system-on-panel in which not only a driving circuit such as a shift register but also a logic circuit such as a clock control circuit, a memory circuit, and a signal conversion circuit is formed on the same substrate.

Since such a logic circuit requires an operating speed as high as the GHz order, a polysilicon TFT is also required to have an extremely high operating speed. In order to realize such requirement, it is necessary to make a circuit element minute according to the scaling law.

However, it is very difficult to form a fine pattern with a wiring width of 1 $\mu$m or less on a generally used large glass substrate. For example, in the glass substrate, there occurs a problem such as undulation and shrinkage of the surface of the substrate. Moreover, it is very difficult to realize such an optical system as is capable of forming a fine pattern in a wide range, so that the formation of a fine pattern is restricted also by the development of a light exposure technique in an aspect.

Thus, at present, it is the limit to form a driving circuit such as a shift register on the same substrate (nevertheless, the operating speed is insufficient so that divided driving is carried out), and other logic circuit is provided by an external IC.

SUMMARY OF THE INVENTION

In the present day in which a lightweight, thin, short, and small device is desired, the electrooptical device is also required to become small and lightweight to the utmost. However, even if a driving circuit is made built-in to increase the functionality of a liquid crystal panel, as long as an external IC is attached to the liquid crystal panel, it anyway becomes an obstacle to making a device miniaturized and lightweight.

The present invention has been made in view of the above problems, and an object of the present invention is to provide an electrooptical device superior in portability and functionality by further systematizing a liquid crystal module.

According to an aspect of the present invention, an electrooptical device comprises a first substrate; a second substrate; and an electrooptical modulating layer disposed between the first substrate and the second substrate, wherein: a plurality of thin film transistors constituting a pixel matrix circuit, a source driving circuit, and a gate driving circuit, and at least one IC chip constituting a logic circuit are disposed on the first substrate; the first substrate and the second substrate are bonded to each other in such a manner that all edges except one edge are trued up each other between the first substrate and the second substrate; and the IC chip is attached to the first substrate adjacent to the one edge.

According to another aspect of the present invention, an electrooptical device comprises a first substrate; a second substrate; and an electrooptical modulating layer disposed between the first substrate and the second substrate; wherein: a plurality of thin film transistors constituting a pixel matrix circuit, a source driving circuit, and a gate driving circuit, and at least one IC chip constituting a logic circuit are disposed on the first substrate; the first substrate and the second substrate are bonded to each other in such a manner that all edges except a portion where an FPC (Flexible Print Circuit) is attached are trued up each other between the first substrate and the second substrate; and the IC chip is attached to the portion where the FPC is attached.

According to still another aspect of the present invention, an electrooptical device comprises a first substrate; a second substrate; and an electrooptical modulating layer disposed between the first substrate and the second substrate; wherein: a plurality of thin film transistors constituting a pixel matrix circuit, a source driving circuit, and a gate driving circuit, and at least one IC chip constituting a logic circuit are disposed on the first substrate; the first substrate is exposed only at a portion where an FPC is attached; and the IC chip is attached to the portion where the FPC is attached.

In the present invention, a liquid crystal layer is disposed between the first substrate and the second substrate to form a liquid crystal panel. At this time, although the second substrate is bonded onto the first substrate, edges (side faces) of the respective substrates are trued up each other, which is the feature of the present invention.

This structure can be obtained by cutting the first substrate and the second substrate together, or by cutting at the same position from both sides of the front and back.

However, only at the portion where the FPC is attached, the first substrate must be exposed by removing the second substrate. Thus, since the first substrate is always exposed only at that portion, that portion is effectively used as an attachment portion of IC chips.

The present invention is intended to keep the size of the first substrate to a necessary minimum by effectively using the exposed portion of the first substrate, which is conventionally used only as an attachment portion of an FPC, as an attachment portion of an IC chip.

BRIEF DESCRIPTION OF THE DRAWINGS

In the accompanying drawings;

FIG. 13 is an enlarged view showing a circuit constituting a liquid crystal module in Embodiment 12;

FIG. 17 is a view showing a system structure of a liquid crystal module in Embodiment 18;

FIGS. 22A to 22F are views respectively for explaining an example of an electronic equipment in Embodiment 22.

DETAILED DESCRIPTION OF THE PREFERRED EMBODIMENTS

Preferred embodiments of the present invention will now be described with reference to the accompanying drawings.

Embodiment 1

Figure 1:
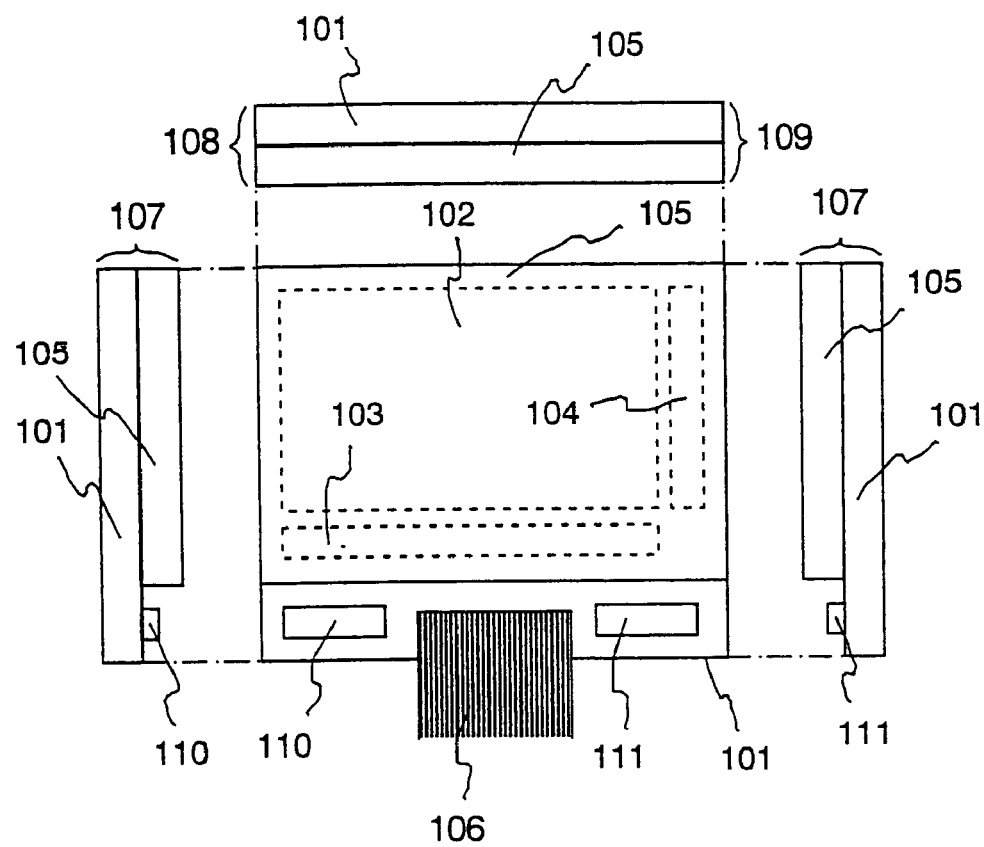
FIG. 1 is a view showing a structure of a liquid crystal module in Embodiment 1.

The structure of the present invention will be described with reference to FIG. 1. FIG. 1 shows a liquid crystal module of the present invention. Incidentally, the liquid crystal module means a completed liquid crystal panel equipped with necessary parts (polarizing plate, external IC, etc.). In this embodiment, parts such as a polarizing plate, which do not directly relate to the structure of the present invention, are omitted.

In FIG. 1, reference numeral 101 denotes a first substrate. A pixel matrix circuit 102, a source driving circuit 103, and a gate driving circuit 104 are formed by TFTs on the first substrate 101. The TFT includes a top gate type and a bottom gate type (typically a reverse stagger type). Reference numeral 105 denotes a second substrate which is an opposite substrate for holding an electrooptical modulating layer (liquid crystal in this embodiment) against the first substrate 101.

A substrate having an insulating surface is used as each of the first substrate and the second substrate. The substrate having the insulating surface includes a glass substrate, a quartz substrate, a ceramic substrate, a silicon substrate, and the like in which an under film is provided. The quartz substrate may be used even if an under film is not provided.

The feature of the present invention is that the edges of the first substrate 101 and the edges of the second substrate 105 are made as flush as possible. That is, the present invention is characterized in that the substrates are bonded to each other in such a manner that all edges except one edge are trued up each other.

In this case, it is preferable that the one edge is only one side. Thus, in the case where the first substrate is made of a square glass substrate, there is obtained such a state that three edges are trued up each other between the first substrate and the second substrate, and only one side is not flush. For example, as shown in FIG. 1, it is desirable to make flush all edges 107 to 109 except a portion where an FPC 106 is attached.

In the portion where the FPC is attached (portion adjacent to the above one edge), since it is necessary to make wiring lines on the first substrate 101 exposed, only the second substrate 105 must be removed. In the present invention, for such reason, IC chips 110 and 111 are formed on the exposed first substrate 101 by a COG (chip on glass) method.

There are known two methods of attaching an IC chip by the COG method, that is, a face down method and a face up method (also called a wire bonding method). If the face down method is used in the present invention, a device formation surface of the IC chips 110 and 111 is directed to the side of the first substrate 101. If the face up method is used, a device formation surface of the IC chips 110 and 111 is directed to the side of the second substrate 105.

That is, all the edges 107 to 109 of the first substrate 101 and the second substrate 105 are trued up each other in the portions except the FPC attaching portion, and the first substrate 101 is exposed only at the FPC attaching portion. Then the IC chips 110 and 111 are attached to the exposed portion.

Since in the IC chip, a fine pattern of as deep submicron as 0.35 µm or less (preferably 0.2 µm or less) can be formed, a complicated logic circuit can be constituted on the chip of several mm square.

The number of IC chips attached to the liquid crystal panel of the present invention is not limited to two, but one or plural IC chips may be provided according to necessity.

By adopting the structure as described above, an occupied area of the first substrate 101 can be restricted to a necessary minimum. That is, by effectively using an attaching portion of the FPC of the first substrate 101 as an attaching portion of the IC chip, the size of the liquid crystal panel can be made as small as possible.

In the case where the pixel matrix circuit 102 and the driving circuits 103 and 104 are constituted by reverse stagger type TFTs which can be manufactured at an inexpensive manufacturing cost, the manufacturing cost of the liquid crystal panel main body can be kept low. Like this, by keeping the cost of the liquid crystal panel main body as low as possible, a product price of the liquid crystal module equipped with IC chips can be lowered.

Further, the structure shown in FIG. 1 has also a meaningful effect in the manufacturing process of the liquid crystal panel. Normally, in the liquid crystal panel, a plurality of panels are obtained from one substrate (called multifaced production) so that a throughput is improved and a unit price per one liquid crystal panel is lowered. Thus, the effect that the size of the liquid crystal panel can be made minimum as in the present invention, is effective in increasing the number of panels which can be formed in one large substrate.

Conventionally, although an external logic circuit formed on a printed board is connected to a monolithic liquid crystal panel by an FPC to exchange signals, in the present invention, a necessary logic circuit is made into one chip and is formed on the same substrate. Thus, it is possible to realize a liquid crystal module very excellent in portability and functionality.

Since the liquid crystal module itself formed on a thin glass substrate has a function as a display device, it is possible to make a miniaturized and lightweight electronic equipment (video camera, portable information terminal, etc.) provided with the liquid crystal module.

Embodiment 2

Figure 2:
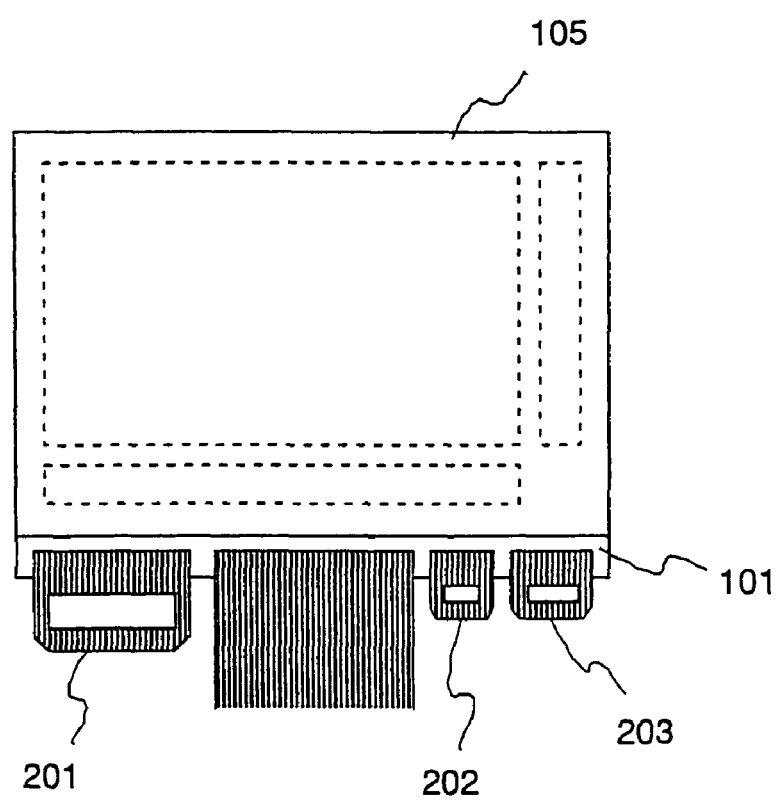
FIG. 2 is a view showing a structure of a liquid crystal module in Embodiment 2.

Although an example in which the COG method is used as an attaching method of an IC chip is shown in the embodiment 1, a TAB (tape automated bonding) method may be used. FIG. 2 shows an example of a structure in which the TAB method is used.

In FIG. 2, a first substrate 101 and a second substrate 105 are bonded to each other in a manner as described in the embodiment 1. Of course, as described in the embodiment 1, all edges except an FPC attaching portion are trued up each other between the first substrate 101 and the second substrate 105, and the first substrate 101 is exposed only at an FPC attaching portion.

In this embodiment, TCPs (tape carrier package) 201 to 203 are attached to the exposed portion of the first substrate 101. The TCP means such as is obtained by mounting a logic IC on a flexible tape by ganged bonding. Actually, the FPC is the same as the TCP.

If the TAB method is used, the freedom on a mounting surface, such as a connection pitch, shape, opening structure, and bending structure, is improved. Thus, the TAB method is suitable for making the connection pitch fine, and making a liquid crystal module thin, lightweight, and compact, which accompanies a liquid crystal panel made large volume, highly fine, and colorized.

Embodiment 3

Figure 3:
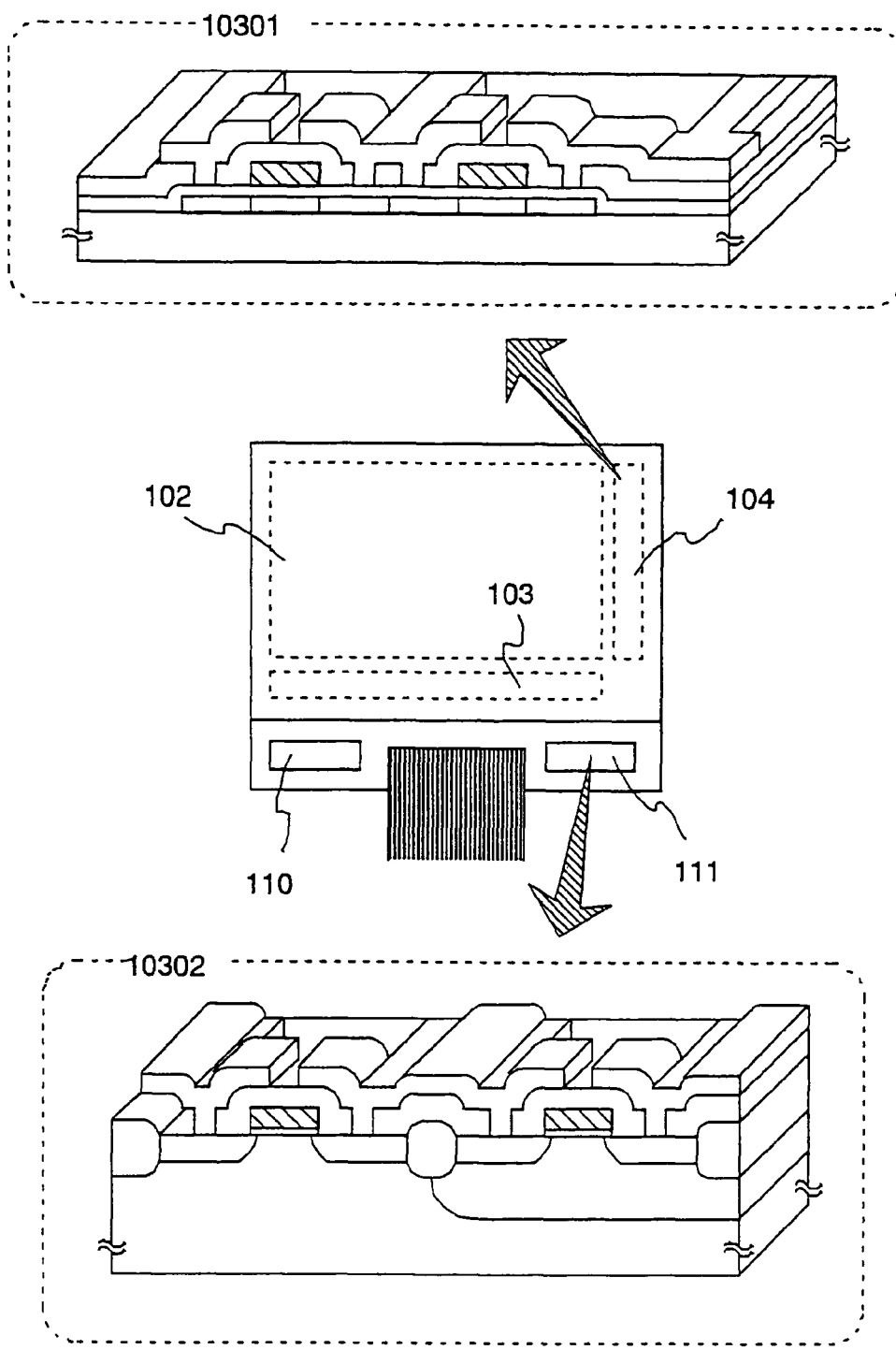
FIG. 3 is an enlarged view showing a circuit constituting a liquid crystal module in Embodiment 3.

The IC chips 110 and 111 used in the embodiment 1 may be formed of MOSFETs (also called IGFETs) using a bulk single crystal. FIG. 3 shows an example in which an IC chip using a bulk single crystal is mounted. The structure of a liquid crystal module shown in FIG. 3 is similar to that of the embodiment 1.

At this time, a source driving circuit 103 and a gate driving circuit 104 are constituted by a top gate type TFT (denoted by 10301). FIG. 3 shows a CMOS circuit (inverter circuit) in which an N-type TFT and a P-type TFT are complementarily combined with each other. A shift register circuit, a buffer circuit, an analog switch circuit, and the like are normally constituted by the CMOS circuit as a unit.

The CMOS circuit 10301 can be constituted by top gate type TFTs formed by any means.

The IC chips 110 and 111 are constituted by MOSFETs (denoted by 10302) using a bulk single crystal. The MOSFET 10302 is formed by a normal IC forming technique. The detailed description thereof will be omitted in this embodiment.

In the case where the bulk single crystal is used, since a conventional IC technique can be followed, an extremely high yield and reliability can be secured. Moreover, an IC chip having high functionality can be attached with a small mounting area.

Embodiment 4

Figure 4:
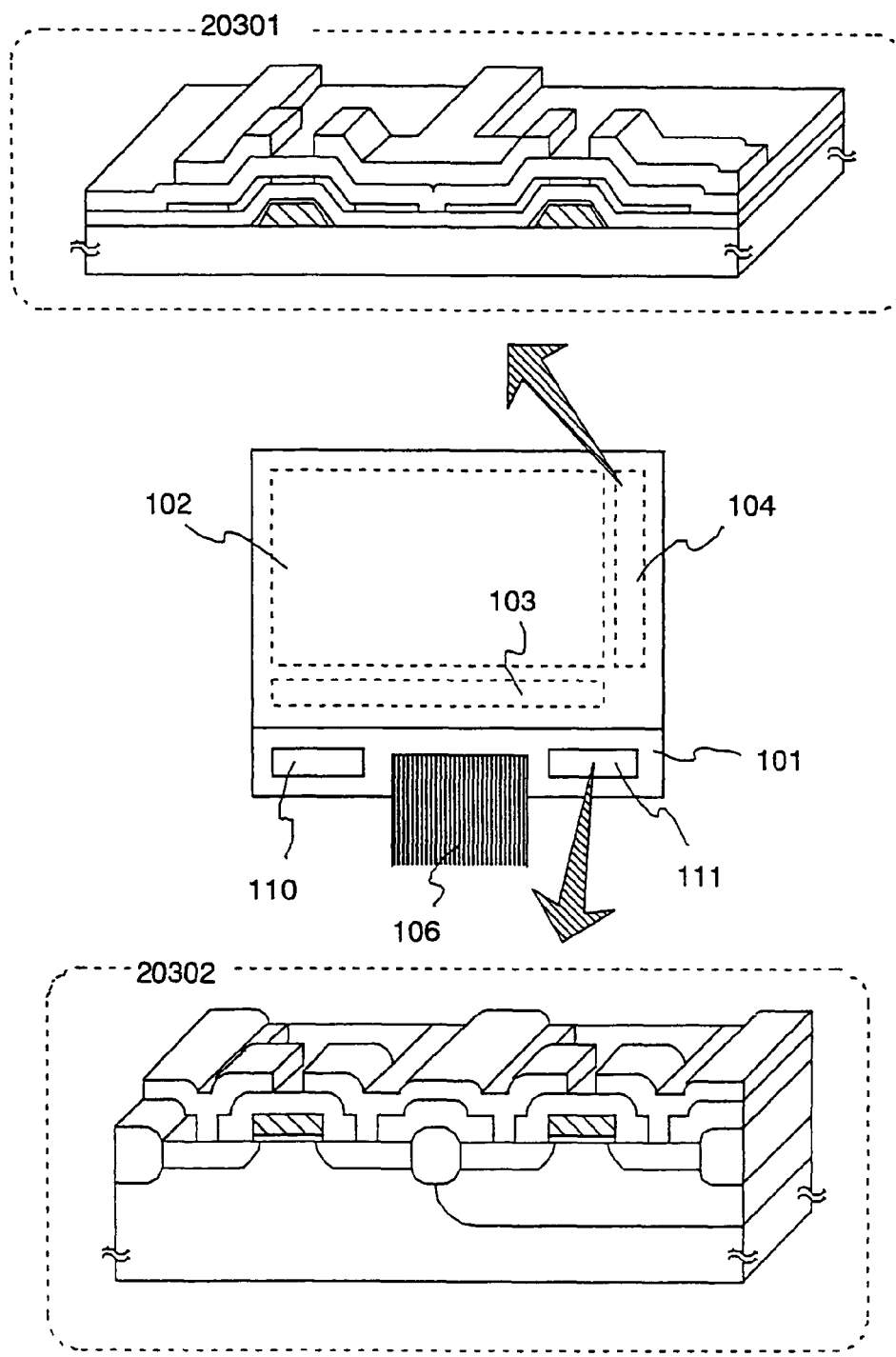
FIG. 4 is an enlarged view showing a circuit constituting a liquid crystal module in Embodiment 4.

In this embodiment, the source driving circuit 103 and the gate driving circuit 104 in the embodiment 3 are constituted by reverse stagger type TFTs (denoted by 20301). FIG. 4 shows an example in which an IC chip using a bulk single crystal is used. The structure of a liquid crystal module shown in FIG. 4 is similar to that of the embodiment 1.

FIG. 4 shows a CMOS circuit (inverter circuit) in which an N-type TFT and a P-type TFT are complementarily combined with each other. A shift register circuit, a buffer circuit, an analog switch circuit, and the like are normally constituted by the CMOS circuit as a unit.

The CMOS circuit 20301 can be constituted by bottom gate type TFTs formed by any means.

Next, IC chips 20110 and 20111 are constituted by MOSFETs (denoted by 20302) using a bulk single crystal. The MOSFET 20302 is formed by a normal IC forming technique. The detailed description thereof will be omitted in this embodiment.

In the case where a bulk single crystal is used as an IC chip, since a conventional IC technique can be followed, an extremely high yield and reliability can be secured. Moreover, an IC chip having high functionality can be attached with a small mounting area.

Embodiment 5

Figure 5:
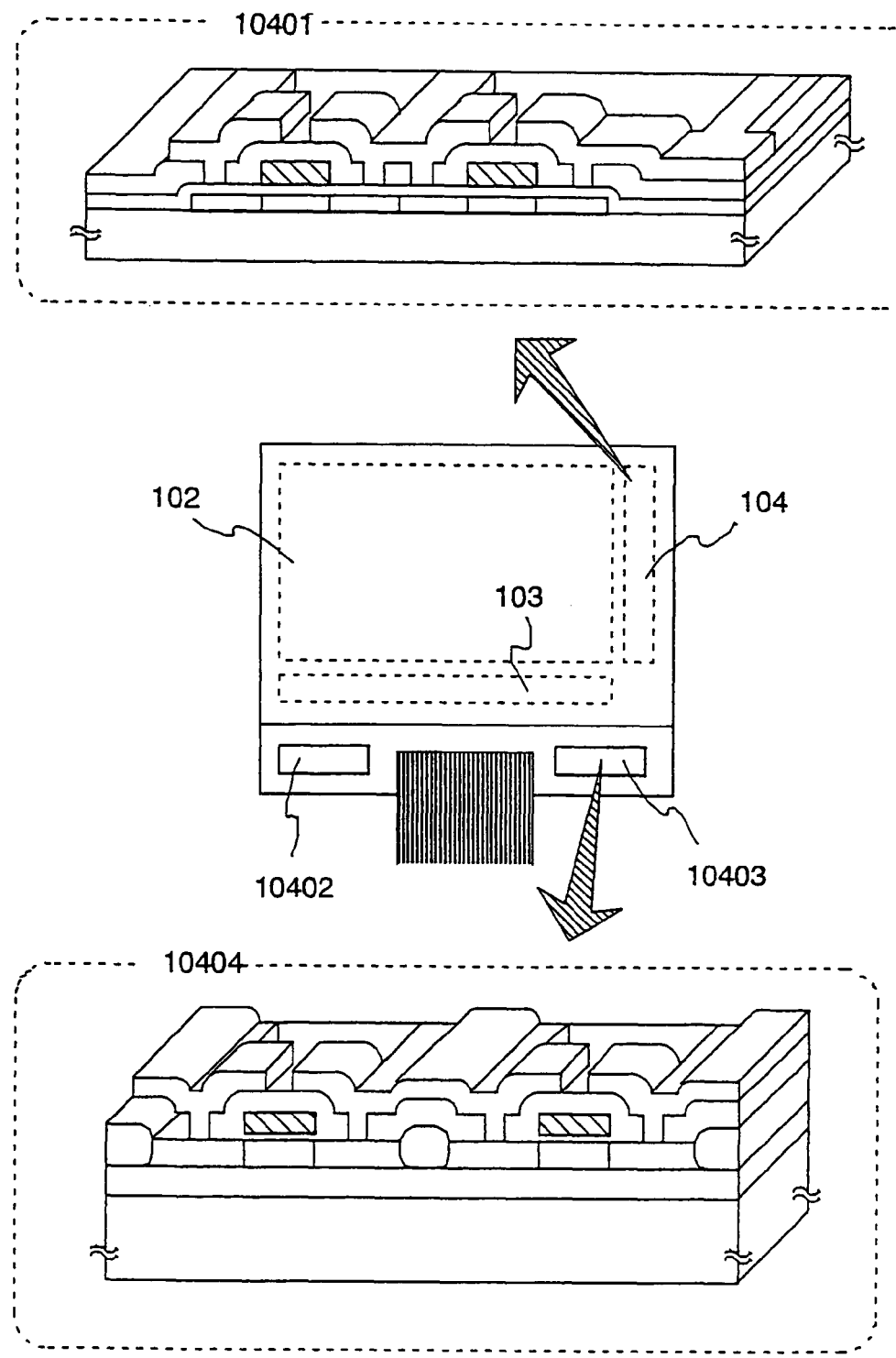
FIG. 5 is an enlarged view showing a circuit constituting a liquid crystal module in Embodiment 5.

In this embodiment, an example in which an IC chip mounted on a liquid crystal module is formed of an SOI structure, will be described. FIG. 5 shows an example in which an IC chip of the SOI structure is mounted. The structure of a liquid crystal panel shown in FIG. 5 is similar to that of the embodiment 1.

In FIG. 5, a source driving circuit 103 and a gate driving circuit 104 are respectively constituted by a CMOS circuit (denoted by 10401), constituted by top gate type TFTs, as a unit circuit. IC chips 10402 and 10403 are constituted by FETs (denoted by 10404) of the SOI structure.

In FIG. 5, although the SOI structure denoted by 10404 is an example in which transistors are formed on a well-known SIMOX substrate, any other SOI structure (bonded SOI, SOI using a smart cut method, and the like) can be used. The detailed description of the SOI structure will be omitted.

In the case of the SOI structure, it is possible to constitute a circuit superior in an operating speed and reliability to a MOSFET using a bulk single crystal. It is conceivable that this is caused from decrease of parasitic capacitance, suppression of a short channel effect, and the like by thinning an active layer.

It is also possible to attach an IC chip in which a three-dimensional structure is made by using the SOI technique. In this case, it is possible to remarkably improve the function of a circuit without increasing a mounting area.

Embodiment 6

Figure 6:
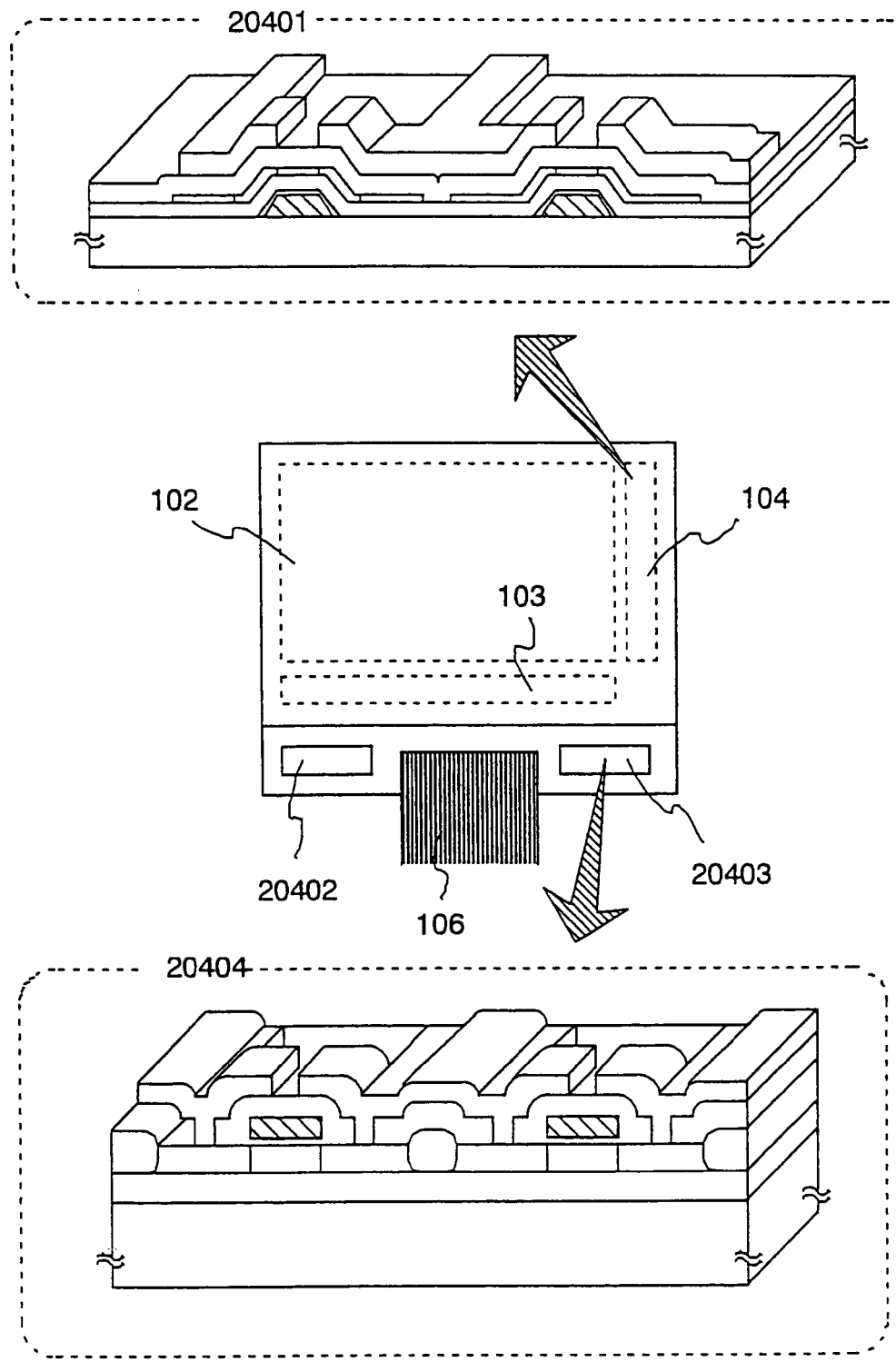
FIG. 6 is an enlarged view showing a circuit constituting a liquid crystal module in Embodiment 6.

In this embodiment, the source driving circuit 103 and the gate driving circuit 104 in the embodiment 5 are constituted by bottom gate type TFTs. FIG. 6 shows an example in which an IC chip of an SOI structure is mounted. The structure of a liquid crystal panel shown in FIG. 6 is similar to that of the embodiment 1.

In FIG. 6, a source driving circuit 103 and a gate driving circuit 104 are respectively constituted by CMOS circuits (denoted by 20401) constituted by reverse stagger type TFTs. IC chips 20402 and 20403 are constituted by FETs (denoted by 20404) of the SOI structure.

In FIG. 6, although the SOI structure denoted by 20404 is an example in which transistors are formed on a well-known SIMOX substrate, any other SOI structure (bonded SOI, SOI using a smart cut method, and the like) can be used. The detailed description of the SOI structure will be omitted.

In the case of the SOI structure, it is possible to constitute a circuit superior in an operating speed and reliability to a MOSFET using a bulk single crystal. It is conceivable that this is caused from the decrease of parasitic capacitance, suppression of a short channel effect, and the like by thinning an active layer.

It is also possible to attach an IC chip in which a three-dimensional structure is made by using the SOI technique. In this case, it is possible to remarkably improve the function of a circuit without increasing a mounting area.

Embodiment 7

In this embodiment, a method of forming an active layer of a top gate type TFT constituting a pixel matrix circuit or a driving circuit on the first substrate will be described. Concretely, there is used a means in which after an amorphous silicon film is crystallized by a technique disclosed in Japanese Patent Laid-open No. Hei. 7-130652, a catalytic element used for the crystallization is removed. The disclosure is incorporated herein by reference.

First, a quartz substrate 10501 is prepared as a substrate having an insulating surface. Next, an under film 10502 is formed on the quartz substrate 10501. It is preferable to make the under film as flat as possible. A silicon substrate may be used instead of the quartz substrate. In that case, the silicon substrate is subjected to a thermal oxidation process in an atmosphere containing a halide gas, and it is appropriate that a thermal oxidation film is used as an under film.

Next, an amorphous silicon film 10503 is formed. The amorphous silicon film 10503 is adjusted so that the final film thickness (film thickness determined after giving consideration to the decrease in the film thickness after thermal oxidation) becomes 10 to 75 nm (preferably 15 to 45 nm). As a film forming method, a low pressure CVD method or a plasma CVD method may be used.

In that case, it is desirable that the concentration of each of C (carbon) and N (nitrogen) contained in the amorphous silicon film 10503 is made less than $5 \times 10^{18}$ atoms/cm$^3$ (typically not larger than $5 \times 10^{17}$ atoms/cm$^3$, preferably, not larger than $2 \times 10^{17}$ atoms/cm$^3$), and the concentration of O (oxygen) is made less than $1.5 \times 10^{19}$ atoms/cm$^3$ (typically not larger than $1 \times 10^{18}$ atoms/cm$^3$, preferably not larger than $5 \times 10^{17}$ atoms/cm$^3$). Since these impurities may hinder the crystallization in a subsequent crystallization step, they are not preferable.

Next, a crystallization step of the amorphous silicon film 10503 is carried out. A technique disclosed in Japanese Patent Laid-open No. Hei. 7-130652 by the present inventor is used as a means for crystallization. Although means of both embodiment 1 and embodiment 2 of the publication may be used, in this invention, it is preferable to use a technique disclosed in the embodiment 2 of the publication (the details of the technique are disclosed in Japanese Patent Laid-open No. Hei. 8-78329. The disclosure is also incorporated herein by reference.).

Figure 7A:
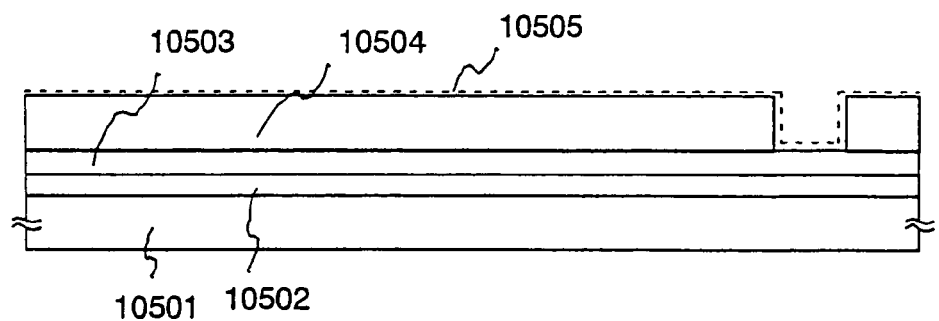
FIGS. 7A to 7D are views for explaining manufacturing steps of an active layer in Embodiment 7.

In the technique disclosed in Japanese Patent Laid-open No. Hei. 8-78329, a mask insulating film 10504 for selecting added regions of a catalytic element is first formed. Then a solution containing nickel (Ni) as the catalytic element for promoting crystallization of the amorphous silicon film 10503 is applied by a spin coating method to form a Ni containing layer 10505 (FIG. 7A).

As the catalytic element, it is also possible to use cobalt (Co), iron (Fe), palladium (Pd), platinum (Pt), copper (Cu), gold (Au), germanium (Ge), lead (Pb), indium (In) or the like other than nickel.

The adding step of the catalytic element is not restricted to the spin coating method, but it is also possible to use an ion implantation method or a plasma doping method using a resist mask. In this case, since it becomes easy to lower an occupied area of an added region and to control a growth distance of a lateral growth region, the method becomes an effective technique when a minute circuit is formed.

Next, after the adding step of the catalytic element is ended, dehydrogenating at about 450° C. for 1 hour is carried out, and then a heat treatment is carried out in an inert gas atmosphere, a hydrogen atmosphere, or an oxygen atmosphere at a temperature of 500 to 700° C. (typically 550 to 650° C.) for 4 to 24 hours to crystallize the amorphous silicon film 10503. In this embodiment, a heat treatment at 570° C. for 14 hours is carried out in a nitrogen atmosphere.

Figure 7B:
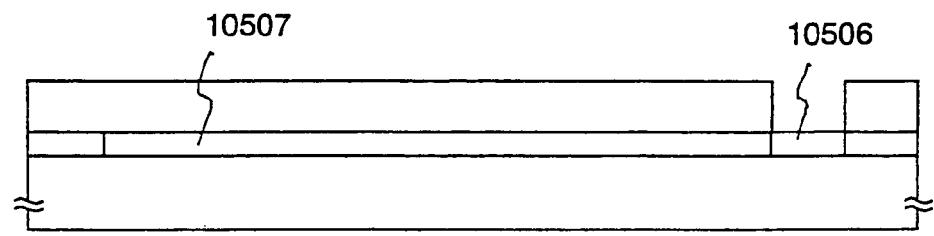

At this time, crystallization progresses first from nuclei generated in a region 10506 in which nickel was added, and a crystalline region 10507 grown almost in parallel to the surface of the substrate 10501 is formed. The crystalline region 10507 is called a lateral growth region by the present inventors et al. Since individual crystals in the lateral growth region are gathered in a state in which they are relatively uniform, the lateral growth region has an advantage that the total crystallinity is excellent (FIG. 7B).

Figure 7C:
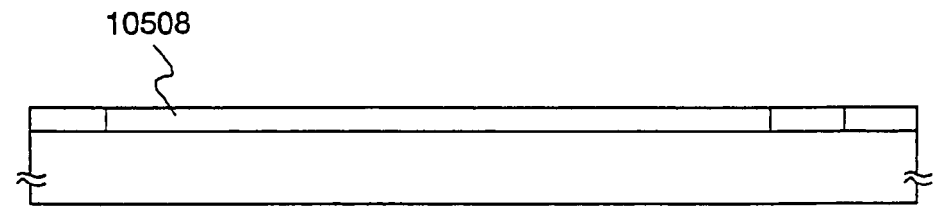

After the heat treatment for crystallization is ended, a heat treatment (gettering process of the catalytic element) for removing or lowering the catalytic element (nickel) is carried out. In this heat treatment, a halogen element is made contained in a processing atmosphere, and the gettering effect of the halogen element to a metallic element is used (FIG. 7C).

In order to sufficiently obtain the gettering effect of the halogen element, it is preferable to carry out the foregoing heat treatment at a temperature exceeding 700° C. If a temperature is not higher than this temperature, decomposition of a halogen compound in the processing atmosphere becomes difficult, so that there is a fear that the gettering effect comes not to be obtained. Thus, a heat treatment temperature is made preferably 800 to 1000° C. (typically 950° C.), and a processing time is made 0.1 to 6 hours, typically 0.5 to 1 hour.

In a typical example, a heat treatment at 950° C. for 30 minutes is carried out in an atmosphere of an oxygen atmosphere containing hydrogen chloride (HCl) with a concentration of 0.5 to 10 vol % (in this embodiment, 3 vol %). If the concentration of HCl is above the foregoing concentration, unevenness comparable with the film thickness is formed on the surface of the active layer 10508, so that such a high concentration is not preferable.

As a compound containing a halogen element, other than the HCl gas, a kind of or plural kinds of compounds containing halogen elements, selected from the group consisting of HF, NF$_3$, HBr, Cl$_2$, ClF$_3$, BCl$_3$, F$_2$, and Br$_2$ may be used.

In this step, nickel in the lateral growth region 10507 is gettered by the action of chlorine and is converted into volatile nickel chloride to escape into the air, so that nickel is removed. The concentration of nickel in a lateral growth region 10508 obtained after this step is lowered to $5 \times 10^{17}$ atoms/cm$^3$ or less (typically $2 \times 10^{17}$ atoms/cm$^3$ or less). According to the experience of the present inventor et al, if the concentration of nickel is $1 \times 10^{18}$ atoms/cm$^3$ or less (typically $5 \times 10^{17}$ atoms/cm$^3$ or less), nickel does not have a bad influence on the TFT characteristics.

After the gettering process of the catalytic element is ended in the manner described above, patterning of the crystalline silicon film is next carried out to form an active layer 10509 made of only the lateral growth region 10508. Next, a gate insulating film 10510 made of an insulating film containing silicon is formed. It is appropriate that the thickness of the gate insulating film 10510 is adjusted within the range of 20 to 250 nm in consideration of the increase in a subsequent thermal oxidation step as well. Moreover, a well-known vapor phase method (plasma CVD method, sputtering method, etc.) may be used as a film forming method.

Figure 7D:
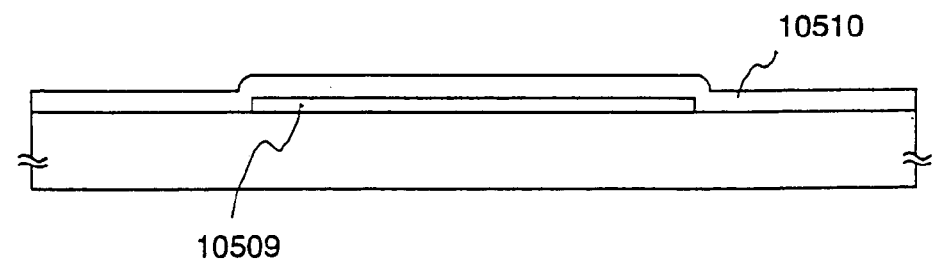

After the gate insulating film 10510 is formed in this way, a gettering process of the catalytic element is again carried out. The condition of this gettering process may be the same as the foregoing condition. The catalytic element is again gettered by this heat treatment, so that the concentration of the catalytic element remaining in the active layer 10509 is further lowered (FIG. 7D).

By this heat treatment, a thermal oxidation reaction progresses in the interface between the active layer 10509 and the gate insulating film 10510 so that the thickness of the gate insulting film 10510 is increased by a thermal oxidation film. When the thermal oxidation film is formed in this way, it is possible to obtain a semiconductor/insulating film interface with very few interfacial levels. Moreover, there is also obtained an effect to prevent inferior film formation (edge thinning) of the thermal oxidation film at the end of the active layer.

Further, it is also effective that after the heat treatment in the halogen atmosphere is carried out, a heat treatment at about 950° C. for 1 hour is carried out in a nitrogen atmosphere to improve the film quality of the gate insulating film 10519.

Incidentally, although two gettering processes are carried out in this embodiment, even if only either one is carried out, the catalytic element is sufficiently reduced. For example, if the step shown in FIG. 7C is carried out, a heat treatment may be carried out in only an oxygen atmosphere in the subsequent step shown in FIG. 7D.

By the above described steps, it is possible to obtain the active layer extremely excellent in the interfacial characteristics and crystallinity. Subsequently, it is satisfactory if a TFT is completed by a well-known TFT manufacturing step, and desired circuits such as a pixel matrix circuit and a driving circuit are constituted on the same substrate.

The top gate type TFT shown in this embodiment has superior electrical characteristics as follow.

(1) The subthreshold coefficient indicating switching performance (promptness of switching of on/off operation) of a TFT is as small as 60 to 100 mV/decade (typically 60 to 85 mV/decade) for both an N-channel TFT and a P-channel TFT.

(2) The field effect mobility ($\mu_{FE}$) as an index of an operating speed of a TFT is as large as 200 to 650 cm$^2$/Vs (typically 250 to 300 cm$^2$/Vs) for an N-channel TFT, and 100 to 300 cm$^2$/Vs (typically 150 to 200 cm$^2$/Vs) for a P-channel TFT.

(3) The threshold voltage ($V_{th}$) as an index of a driving voltage of a TFT is-as small as −0.5 to 1.5 V for an N-channel TFT and −1.5 to 0.5 V for a P-channel TFT.

Thus, an electric circuit constituted by the top gate type TFTs of this embodiment has an extremely high operating speed. Thus, if the electric circuit is applied to the source driving circuit 103 and the gate driving circuit 104 formed on the first substrate, it is also possible to form a shift register circuit which does not require a means such as divided driving. This is advantageous in making the circuit structure simple and decreasing an occupied area of the circuit.

Embodiment 8

In this embodiment, an example in which a CMOS circuit is formed by complementarily combining an NTFT (N-channel TFT) and a PTFT (P-channel TFT) to constitute a source driving circuit or a gate driving circuit, will be described in the case where a bottom gate type TFT is used.

First, an under film 20502 made of a silicon oxide film is disposed on a glass substrate 20501, and gate electrodes 20503 and 20504 are formed thereon. In this embodiment, although aluminum alloy (aluminum added with scandium of 2 wt %) with a thickness of 200 to 400 nm is used as the gate electrodes 20503 and 20504, chromium, tantalum, tungsten, molybdenum, or polysilicon having conductivity may be used.

Next, the gate electrodes 20503 and 20504 are subjected to anodic oxidation in tartaric acid to form nonporous anodic oxidation films 20505 and 20506. The detailed manufacturing method may be referred to Japanese Patent Laid-open No. Hei. 7-135318. The disclosure is incorporated herein by reference. The anodic oxidation films 20505 and 20506 protect the gate electrodes 20503 and 20504 against a subsequent process temperature.

Then a gate insulating film with a thickness of 100 to 200 nm is formed thereon. A silicon oxide film, a silicon nitride film, or a lamination film of the silicon oxide film and silicon nitride film is used as the gate insulating film 20507. In this embodiment, the anodic oxidation films 20505 and 20506 also function as parts of the gate insulating film.

Next, an amorphous silicon film 20508 with a thickness of 10 to 150 nm (preferably 10 to 75 nm, more preferably 15 to 45 nm) is formed. A semiconductor thin film mainly containing silicon (for example, silicon germanium compound expressed by $Si_xGe_{1-x}$ (0<x<1)) may be used other than the amorphous silicon film.

Figure 8A:
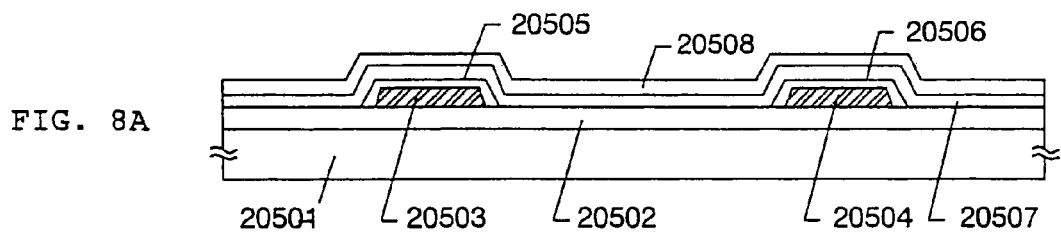
FIGS. 8A to 8E are views for explaining manufacturing steps of an active layer in Embodiment 8.

After the state shown in FIG. 8A is obtained in this way, irradiation of laser light or intense light having intensity comparable with the laser light is carried out to crystallize the amorphous silicon film 20508. Excimer laser light is preferable as the laser light. A pulse laser with a light source of KrF, ArF, or XeCl may be used as an excimer laser.

Intense light from a halogen lamp or a metal halide lamp, infrared light, or intense light from a ultraviolet light lamp may be used as the intense light with intensity comparable with the laser light.

In this embodiment, after the amorphous silicon film 20508 is dehydrogenated, the substrate is scanned with laser light configured into a linear shape from one end of the substrate to the other end to crystallize the entire surface of the amorphous silicon film 20508. At this time, the sweep speed of the laser light is made 1.2 mm/s, the process temperature is made a room temperature, the pulse frequency is made 30 Hz, and the laser energy is made 300 to 315 mJ/cm$^2$ (FIG. 8B).

Figure 8B:
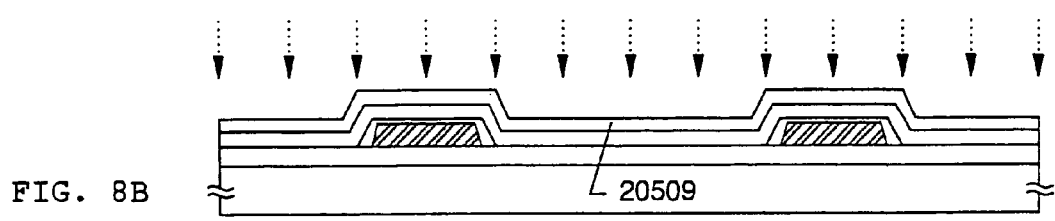
Figure 8C:
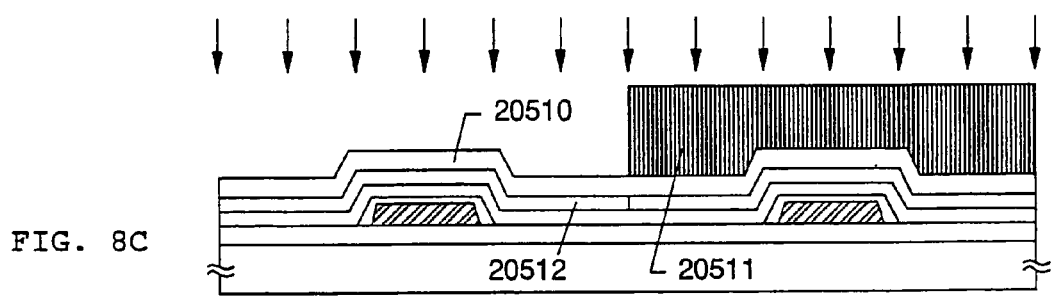

In this way, as shown in FIG. 8B, a crystalline silicon film 20509 is obtained. In this embodiment, channel doping is carried out for both a region which becomes an NTFT and a region which becomes a PTFT so that a threshold voltage is controlled.

In this embodiment, there is shown a structure that an element (for example, phosphorus) selected from group 15 of the periodic table is added to the region which becomes the NTFT in order to move the threshold voltage to a minus side, and an element (for example, boron) selected from group 13 is added to the region which becomes the PTFT in order to shift the threshold voltage to a plus side.

First, a buffer layer 20510 made of a silicon oxide film and having a thickness of 50 to 200 nm (preferably 100 to 150 nm) is formed on the crystalline silicon film 20508.

Then the region which becomes the PTFT is concealed by a resist mask 20511, and phosphorus is added by an ion implantation method (with mass separation) or an ion doping method (without mass separation). A phosphorus containing region 20512 is formed by this channel doping step. Arsenic, antimony or the like may be added instead of phosphorus (FIG. 5C).

At this time, it is appropriate that an acceleration voltage is selected within the range of 5 to 80 KeV (typically 10 to 30 KeV), and a dosage is selected within the range of $1 \times 10^{12}$ to $1 \times 10^{17}$ atoms/cm$^2$ (preferably $1 \times 10^{13}$ to $1 \times 10^{16}$ atoms/cm$^2$). In this embodiment, the acceleration voltage is 30 KeV and the dosage is $5 \times 10^{13}$ atoms/cm$^2$.

The dosage must be experimentally determined in advance. That is, it is previously confirmed to what degree the threshold voltage is shifted in the case where channel doping is not carried out, and it is previously obtained what amount of phosphorus is required to be added to obtain a desired threshold voltage. Thus, it is not necessarily required that the dosage must be within the foregoing range.

At this time, since the crystalline silicon film 20509 is very thin, if ion implantation is directly carried out, the film receives serious damage so that the crystallinity is lost. In the case where ion implantation is carried out for a very thin film, control of concentration of an impurity is very difficult.

However, in this embodiment, since the doping step becomes through doping through the foregoing buffer layer 20510, it is possible to suppress the damage applied to the crystalline silicon film 20509 at the ion implantation. Moreover, since the rather thick buffer layer 20510 exists on the crystalline silicon film 20509, it becomes easy to control the concentration of an impurity added in the crystalline silicon film 20509.

It is preferable to adjust the concentration profile of phosphorus in the crystalline silicon formed by the ion implantation so that the concentration of phosphorus becomes low at a portion where a channel is formed (in the vicinity of an interface where the channel formation region is in contact with the gate insulating film). This effect will be described later.

After the element in group 15 is added into the region which becomes the NTFT in the manner described above, the resist mask 20511 is removed, and a resist mask 20513 is formed to newly conceal the region which becomes the NTFT. Next, an element (in this embodiment, boron) selected from group 13 is added into the region which subsequently becomes the PTFT. In this adding step, the foregoing adding step of phosphorus may be referred to. Of course, gallium, indium or the like may be used other than boron (FIG. 8D).

Figure 8D:
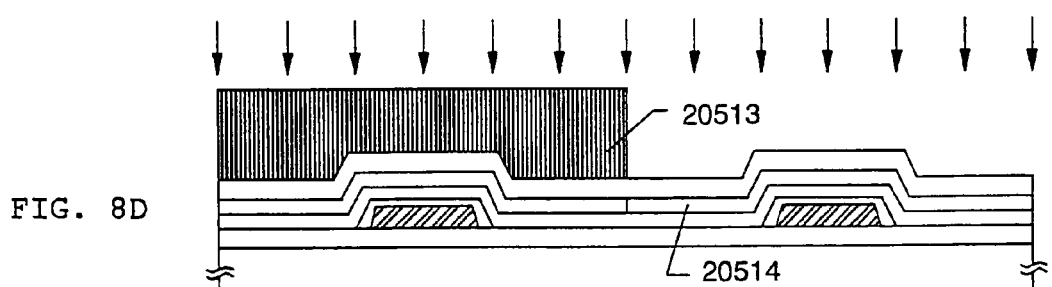

A boron containing region 20514 is formed in the region which becomes the PTFT by the step shown in FIG. 8D. Also in this case, similarly to the case of the foregoing adding step of the element in group 15, the buffer layer 20510 decreases the damage at the ion implantation to facilitate the control of concentration.

Figure 8E:
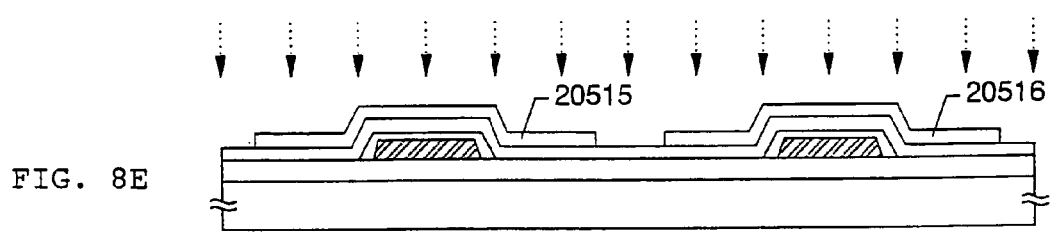

After the above impurity adding step is ended, the buffer layer 20510 and the resist mask 20513 are removed, and then patterning is carried out to form active layers 20515 and 20516. Thereafter, irradiation of excimer laser light is carried out to recover from the damage applied at the ion implantation step and to activate added boron (FIG. 8E).

Figure 9A:
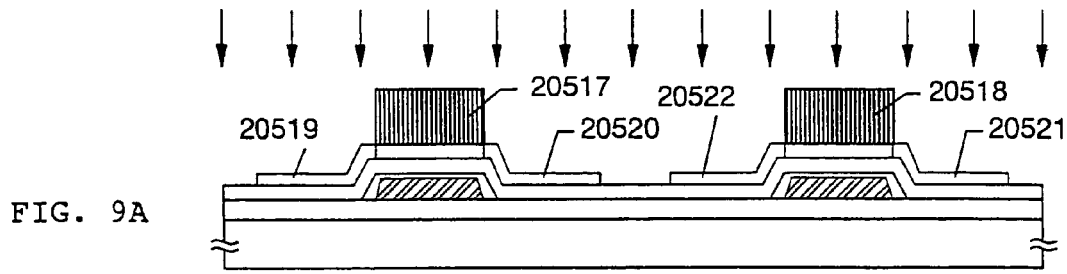
FIGS. 9A to 9E are views for explaining manufacturing steps of an active layer in Embodiment 8.

Next, rear face light exposure is carried out using the gate electrodes 20503 and 20504 as masks to form resist masks 20517 and 20518. An impurity element (typically phosphorus or arsenic) for giving an N type is added to form a low concentration impurity regions 20519 to 20522 with a concentration of about $1 \times 10^{17}$ to $5 \times 10^{18}$ atoms/cm$^3$ (FIG. 9A).

Next, after the resist masks 20517 and 20518 are removed, patterning is again carried out to form resist masks 20523 and 20524. At this time, the PTFT is completely covered. Then an impurity element for giving an N type, the concentration of which is higher than that in FIG. 9A (about $1 \times 10^{19}$ to $1 \times 10^{20}$ atoms/cm$^3$), is again added to form a source region 20525 and a drain region 20526 of the NTFT.

Figure 9B:
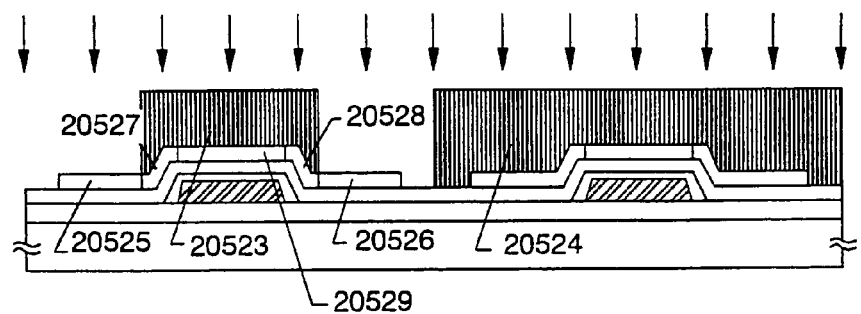

At this time, regions denoted by 20527 and 20528 are ones where the foregoing low concentration regions remain as they are, and the regions subsequently function as LDD (Light Doped Drain) regions. Further, a region denoted by 20529 becomes a channel formation region (FIG. 9B).

Next, after the resist masks 20523 and 20524 are removed, resist masks 20530 and 20531 are formed so as to completely cover the NTFT at this time.

Figure 9C:
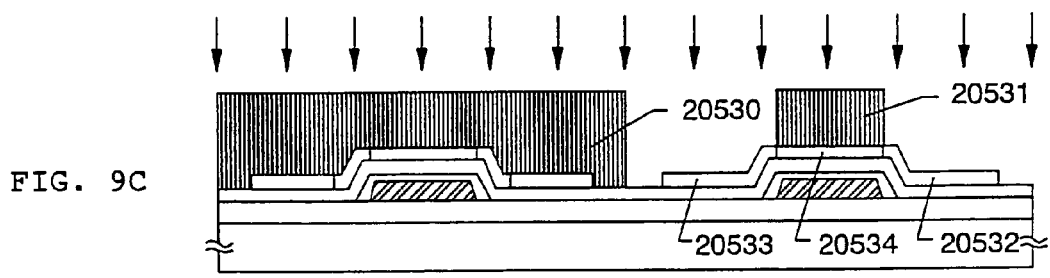

An impurity element (typically boron, gallium, or indium) for giving a P type is added so that the concentration becomes about $1 \times 10^{19}$ to $1 \times 10^{20}$ atoms/cm$^3$, and a source region 20532 and a drain region 20533 of the PTFT are formed. A region denoted by 20534 becomes a channel formation region (FIG. 9C).

Figure 9D:
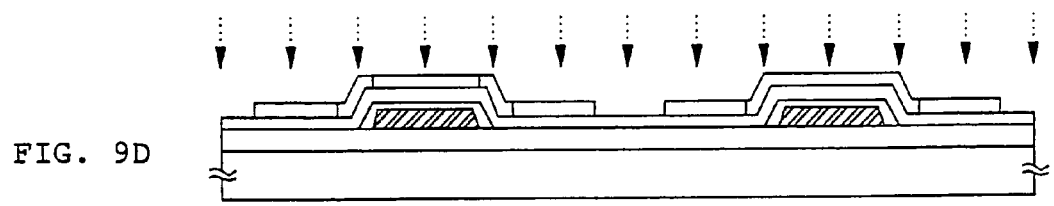

Next, after the resist masks 20530 and 20531 are removed, irradiation of excimer laser light is carried out to recover from the damage applied at the ion implantation and to activate the added impurity (FIG. 9D).

After the laser annealing is ended, an interlayer insulating film 20535 with a thickness of 300 to 500 nm is formed. The interlayer insulating film 20535 is formed of a silicon oxide film, a silicon nitride film, an organic resin film, or a lamination film thereof.

Figure 9E:
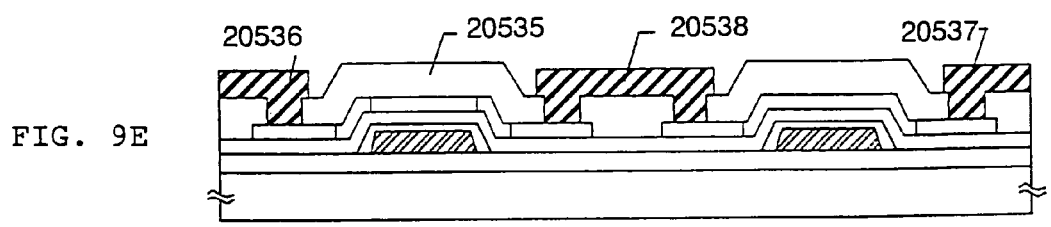

Then source electrodes 20536 and 20537 and a common drain electrode 20538 made of metallic thin films are formed thereon. A film of aluminum, tantalum, titanium, tungsten, or molybdenum, or a lamination film thereof may be used as the metallic thin film. It is appropriate that the film thickness is selected within the range of 100 to 300 nm (FIG. 9E).

Finally, the entire is subjected to a heat treatment at a temperature of about 350° C. for 2 hours in a hydrogen atmosphere to terminate unpaired bonds with hydrogen. Through the above steps, the CMOS circuit having a structure as shown in FIG. 9E is completed.

A pixel TFT constituting a pixel matrix circuit is completed by forming an interlayer insulating film after the above steps, and by forming a pixel electrode electrically connected to a drain electrode.

In the embodiments 1, 2, 4 and 6, the pixel matrix circuit and the driving circuit are constituted by the reverse stagger type TFTs manufactured through the steps as described above. However, the manufacturing steps of this embodiment are only an example for constituting the present invention, and a manufacturing method of the reverse stagger type TFT capable of being used in the present invention is not limited to this embodiment.

Although channel doping is carried out for the NTFT and the PTFT, it is not necessary to carry out channel doping if unnecessary.

Even if channel doping is carried out, it is also conceivable to adopt such a structure that channel doping is carried out for only the NTFT or PTFT. Moreover, it is also possible to adopt a case where elements of the same conductivity are added into both the NTFT and PTFT. Further, an added element (element in group 15 or element in group 13) may be suitably determined by an operator based on which side the threshold voltage is required to be moved between a plus side and a minus side.

Embodiment 9

In this embodiment, there is shown an example of a case employing a semiconductor circuit, instead of an IC chip, using a top gate type TFT explained in the embodiment 7 or a TFT disclosed in Japanese Patent Application No. Hei. 8-301249 or Hei. 8-301250. The disclosures are incorporated herein by reference.

Since the top gate type TFT shown in the embodiment 7 or the TFT disclosed in Japanese Patent Application No. Hei. 8-301249 or Hei. 8-301250 has a very high operating speed, it is also possible to constitute such a logic circuit as is conventionally constituted by an IC chip. Especially, a silicon substrate is used as a substrate, it is possible to handle the TFT like an IC chip.

At this time, it does not matter if the TFT to be formed on the first substrate is formed by any process. In this embodiment, a crystalline silicon film obtained by crystallizing an amorphous silicon film by an excimer laser is used as an active layer. Since such a TFT can be manufactured by a well-known technique, the explanation of manufacturing steps will be omitted.

Figure 10A:
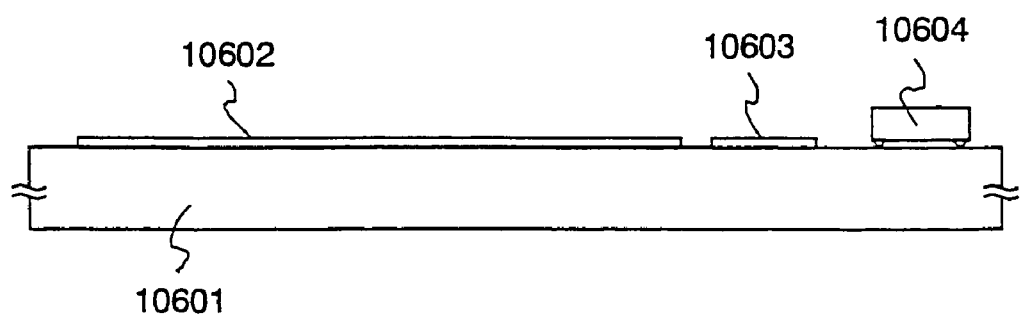
FIGS. 10A and 10B are views respectively for explaining a sectional structure of a liquid crystal module in Embodiment 9.
Figure 10B:
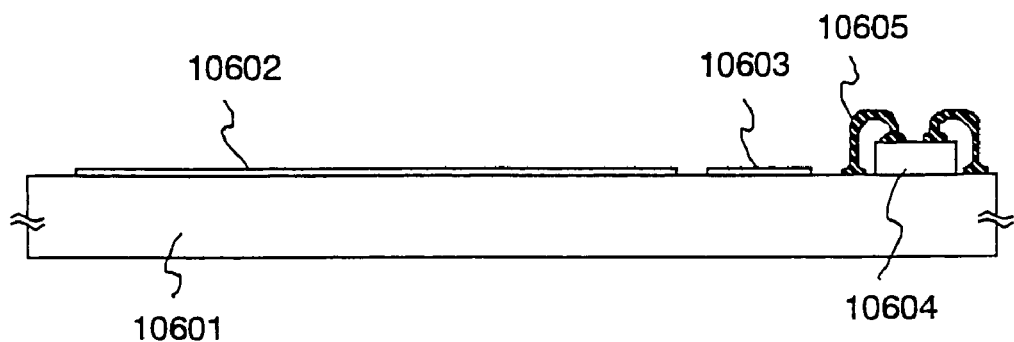

FIGS. 10A and 10B are schematic views showing the state of arrangement on the substrate. In FIG. 10A, 10601 denotes a glass substrate (first substrate), and a pixel matrix circuit 10602 and a source or gate driving circuit 10603, which are constituted by TFTs formed by the foregoing method, are disposed on the glass substrate. Reference numeral 10604 denotes a semiconductor chip constituted by TFTs explained in the embodiment 7 or 8, and is attached by a COG method of a face down system.

FIG. 10B shows a case where a semiconductor chip 10604 is attached by a COG method of a face down system. Reference numeral 10605 denotes a bonding wire.

Embodiment 10

In this embodiment, in the structure of the embodiment 9, there is shown an example in which manufacturing steps of the top gate type TFT formed on the first substrate are different. Concretely, an example in which a gettering effect by P (phosphorus) is employed to remove a catalytic element used in the technique disclosed in Japanese Patent Laid-open No. Hei. 7-130652, will be described.

First, as a substrate having an insulating surface, a glass substrate 10701 on which an under film 10702 is provided, is prepared. A quartz substrate, a ceramic substrate, a silicon substrate or the like may be used instead of the glass substrate.

Figure 11A:
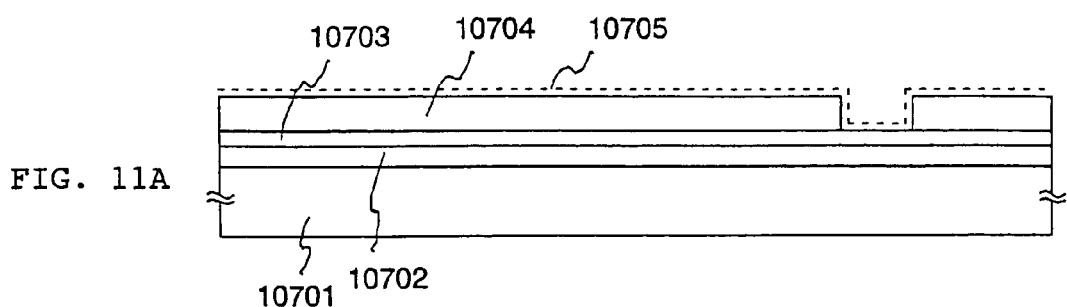
FIGS. 11A to 11D are views for explaining manufacturing steps of an active layer in Embodiment 10.

Next, an amorphous silicon film 10703 with a thickness of 10 to 75 nm (preferably 15 to 45 nm) is formed on the under film. After the amorphous silicon film 10703 is formed, a mask insulating film 10704 is formed, and a nickel containing layer 10705 is formed by a spin coating method (FIG. 11A).

Figure 11B:
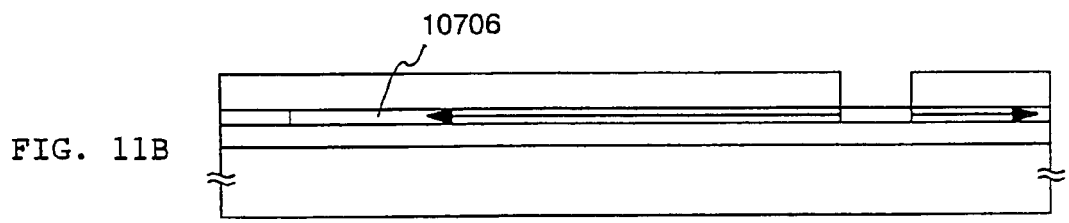

Next, after a dehydrogenating process at about 450° C. for 1 hour is carried out, a heat treatment at 570° C. for 14 hours is carried out to crystallize the amorphous silicon film. In this way, a lateral growth region 10706 is obtained (FIG. 11B).

The steps up to here are the same as the embodiment 7. Next, after the mask insulating film 10704 is removed, a resist mask 10707 is formed on a region (gettered region) where nickel is to be removed. A silicon oxide film or the like may be used instead of the resist mask.

Next, an adding step of a P (phosphorus) element is carried out by an ion implantation method. This step may be carried out by a plasma doping method. The ion implantation may be carried out under the condition that the RF power is 20 W, the acceleration voltage is 5 to 30 KeV (typically 10 KeV), and the dosage of the P element is not less than $1 \times 10^{13}$ ions/cm$^2$ (preferably $5 \times 10^{13}$ to $5 \times 10^{14}$ ions/cm$^2$).

Although described later, the optimum condition of the P ion implantation step is changed by the condition of a heat treatment for gettering, which is subsequently carried out. Thus, an operator must determine the optimum condition from the process viewpoint and economical viewpoint. At the present circumstances, the present inventors consider that it is preferable to make the acceleration voltage 10 KeV and the dosage $1 \times 10^{14}$ to $5 \times 10^{14}$ ions/cm$^2$. This dosage corresponds to about $8 \times 10^{19}$ to $4 \times 10^{20}$ atoms/cm$^3$ in concentration.

Figure 11C:
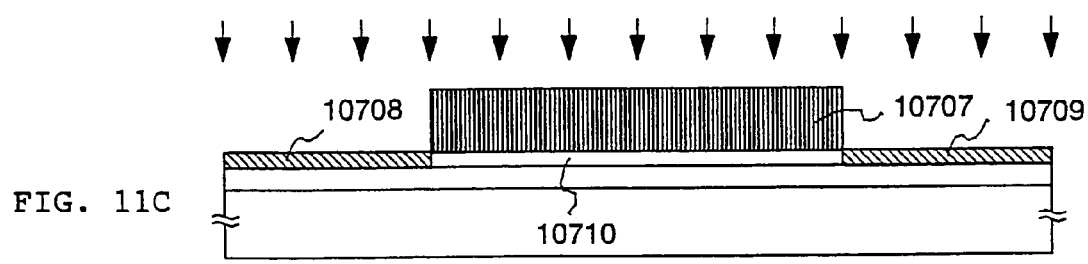

By the adding step of the P ion, gettering regions 10708 and 10709 and a gettered region 10710 are formed. The gettering regions 10708 and 10709 are made amorphous by the impact of implanted ions (FIG. 11C).

Figure 11D:
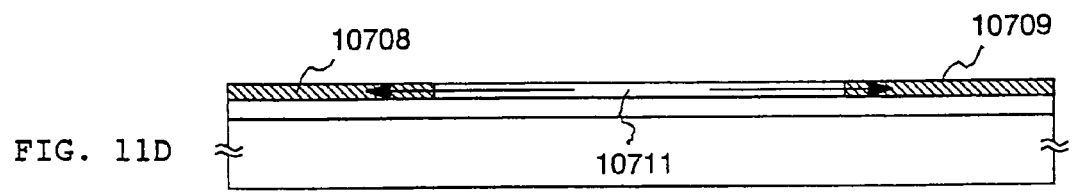

After the adding step of the P ion is ended in this way, the resist mask 10707 is removed, and then a heat treatment for gettering is carried out to gather nickel in the gettered region 10710 to the gettering regions 10708 and 10709. Thus, the gettered region 10711 in which nickel is removed or lowered can be obtained (FIG. 11D).

At this time, it is appropriate that the heat treatment is carried out in an electric heating furnace and in either one of inert gas atmosphere, hydrogen atmosphere, and oxidizing atmosphere. Also, it is appropriate that the temperature is made not less than 400° C. (preferably 550 to 650° C., however, not exceeding the distortion point of glass). In addition, it is appropriate that the process time is made not less than 2 hours (preferably 4 to 12 hours).

In this embodiment, since the top gate type TFT is formed on the glass substrate, the heat treatment for gettering is restricted. However, if a substrate having high heat resistance, such as a quartz substrate or a silicon substrate, is used as the substrate, it is possible to carry out gettering at a higher temperature. If gettering is carried out at a high temperature, a processing time can be shortened by that, so that such gettering is effective.

According to experiments by the present inventor, a sufficient gettering effect can be obtained if the temperature range is made 400 to 1,050° C. (typically 600 to 750° C.) and the processing time is made 1 minute to 20 hours (typically 30 minutes to 3 hours). At this time, the upper limit of the processing temperature is a temperature at which a phosphorus element is not reversely diffused into a gettered region.

If a lateral growth region 107111 obtained in the above step is patterned, it is possible to obtain an active layer superior in crystallinity and having few surplus impurities. Thereafter, it is satisfactory if a TFT is completed in accordance with a well-known. TFT manufacturing step.

Since the top gate type TFT manufactured in accordance with the steps of this embodiment has also very high operation performance, it is suitable for constituting a driving circuit and the like.

Embodiment 11

This embodiment shows an example in which when a reverse stagger type TFT is manufactured on a first substrate, a manufacturing method different from the embodiment 8 is used. Concretely, explanation will be made to an example in which a crystalline silicon film is formed by a technique disclosed in Japanese Patent Laid-open No. Hei. 7-130652, and a catalytic element used at that time is removed by a gettering effect of P (phosphorus).

Figure 12A:
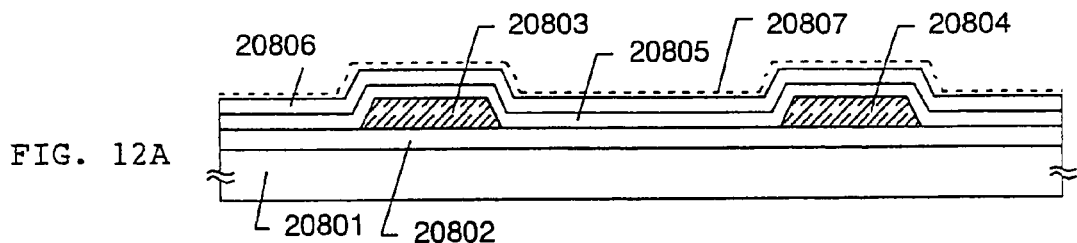
FIGS. 12A to 12E are views for explaining manufacturing steps of an active layer in Embodiment 11.

First, in FIG. 12A, 20801 denotes a glass substrate, 20802 denotes an under film, 20803 and 20804 denote gate electrodes made of N type conductive polysilicon films, 20805 denotes a gate insulating film, and 20806 denotes an amorphous silicon film. It is possible to use any material shown in the embodiment 8 for the gate electrode.

In this embodiment, a film 20807 containing nickel (hereinafter referred to as a nickel containing layer) is formed on the amorphous silicon film 20806. A technique disclosed in Japanese Patent Laid-open No. Hei. 7-130652 by the present inventors et al. may be used as a method of forming the nickel containing layer 20807. Although both means of embodiment 1 and embodiment 2 of the publication may be used, the technique disclosed in the embodiment 1 of the publication is used in this embodiment in view of productivity (FIG. 12A).

As the catalytic element, cobalt (Co), iron (Fe), palladium (Pd), platinum (Pt), copper (Cu), gold (Au), germanium (Ge), lead (Pb), gallium (Ga) or the like may be used instead of nickel.

Although the above publication shows an example in which an adding step of the catalytic element is carried out by a spin coating method, an ion implantation method or a plasma doping method may be used. In this case, since an occupied area of an added region is lowered, and control of a growth distance of a lateral growth region becomes easy, it becomes an effective technique when a minute circuit is constituted.

Figure 12B:
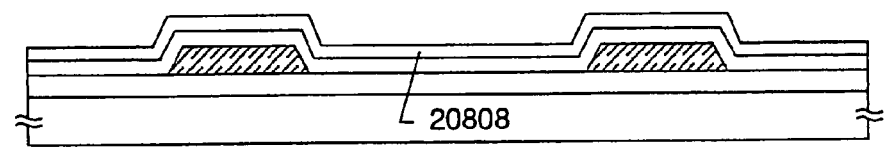

Next, after the adding step of the catalytic element is ended, dehydrogenating at about 500° C. for one hour is carried out, and then a heat treatment (furnace annealing) at 500 to 700° C. (typically 550 to 650° C.) for 4 to 24 hours is carried out in an inert gas atmosphere, a hydrogen atmosphere, or an oxygen atmosphere to crystallize the amorphous silicon film 20806. In this embodiment, a heat treatment at 550° C. for 4 hours is carried out in a nitrogen atmosphere to obtain a crystalline silicon film 20808 (FIG. 12B).

Next, a resist mask 20809 having a plurality of openings is formed. The openings are formed at such positions that regions which are not subsequently used as active layers (are removed) are exposed.

Next, an adding step of phosphorus is carried out by using the resist mask 20809 as a mask. This adding step uses an ion implantation method or an ion doping method. The adding condition is that the RF power is 20 W, the acceleration voltage is 5 to 30 KeV (typically 10 KeV), and the dosage of phosphorus is $1 \times 10^{13}$ atoms/cm$^2$ or more (preferably $5 \times 10^{13}$ to $5 \times 10^{15}$ atoms/cm$^2$).

As a standard of a concentration of added phosphorus, it is appropriate that phosphorus with a concentration higher than the concentration of nickel contained in the crystalline silicon film 20808 by one figure or more is added. Since nickel of about $1 \times 10^{19}$ atoms/cm$^3$ is contained in the foregoing crystalline silicon film 20808, in this case, it is preferable to add phosphorus of about $1 \times 10^{20}$ atoms/cm$^3$.

Figure 12C:
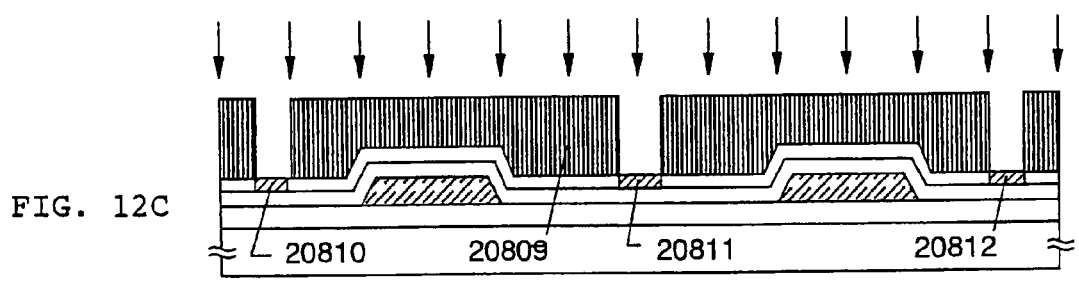

In this way, regions (gettering regions) 20810 to 20812 added with phosphorus are formed in parts of the crystalline silicon film 20808 (FIG. 12C).

Figure 12D:
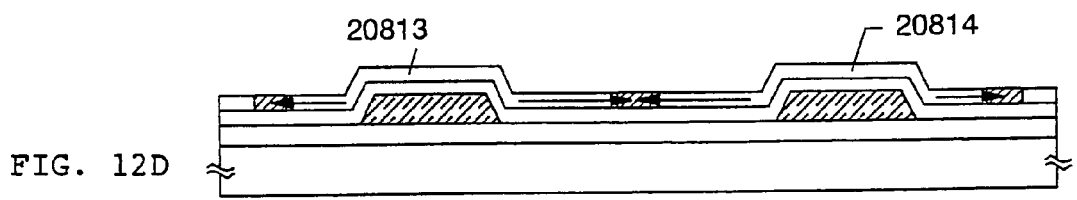

Next, after the resist mask 20809 is removed, a heat treatment for gettering nickel is carried out. By this heat treatment, nickel contained in the gettered regions 20813 and 20814 are moved and captured to the gettering regions 20810 to 20812 as shown by arrows (FIG. 12D).

This heat treatment may be furnace annealing in an inert gas atmosphere, a hydrogen atmosphere, an oxygen atmosphere, or an oxidizing atmosphere containing halogen elements. Besides, it is appropriate that a process temperature is made 400 to 700° C. (preferably 550 to 650° C.), and a process time is made 2 hours or more (preferably 4 to 12 hours). As the process temperature becomes high, the process time becomes short and the gettering effect also becomes high. However, it is desirable to make the temperature 650° C. or less in view of the heat resistance of the glass substrate.

After nickel is gettered into the gettering regions 20810 to 20812 in this way, the crystalline silicon film is patterned to form active layers 20815 and 20816 made of only the gettered regions 20813 and 20814. At this time, since the gettering regions 20810 to 20812 and their vicinities contain nickel of high concentration, it is desirable not to use as an active layer but to completely remove.

It is confirmed by SIMS (secondary ion mass spectroscopy) that the concentration of nickel existing in the active layers 20815 and 20816 obtained through the gettering process is lowered to $5 \times 10^{17}$ atoms/cm$^3$ or less. (The concentration in the present specification is defined as a minimum value of SIMS measurement values.)

In the present circumstances, although it is merely ascertained that the nickel concentration is $5 \times 10^{17}$ atoms/cm$^3$ or less due to the restriction of detection lower limit, it is considered that the concentration actually reaches at least about $1 \times 10^{14}$ atoms/cm$^3$. Experimentally, it is known that if the nickel concentration is $5 \times 10^{17}$ atoms/cm$^3$ or less, nickel does not have an influence on TFT characteristics.

Figure 12E:
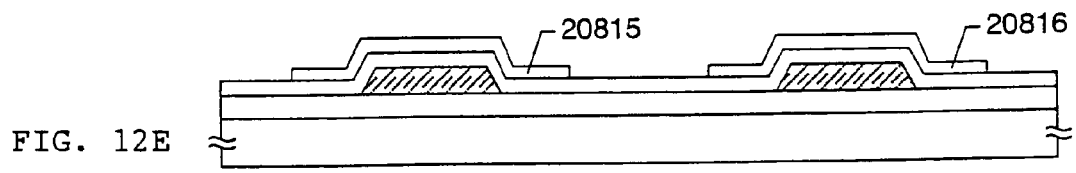

In the manner described above, the state shown in FIG. 12E is obtained. Subsequently, if the steps shown in the embodiment 8 are followed, it is possible to manufacture a CMOS circuit having a structure as shown in FIG. 12E. Of course, it is also possible to apply the technique of this embodiment to a pixel TFT constituting a pixel matrix circuit.

Although this embodiment shows an example in which an ion implantation method or an ion doping method is used as an adding means of phosphorus, annealing (vapor phase method) in an atmosphere containing phosphorus or gettering (solid phase method) into an insulating film containing phosphorus may be used.

Embodiment 12

In this embodiment, an example where an image sensor is mounted on the same substrate with respect to the liquid crystal module shown in the embodiment 1, will be described. In the case of this embodiment, an image sensor 10801 (FIG. 13) is formed of a top gate type TFT.

The image sensor 10801 is constituted by a top gate type TFT portion and a photoelectric conversion portion as denoted by 10802. The photoelectric conversion portion has a structure that a photoelectric conversion layer 10805 is held between a lower electrode (also serves as a drain electrode of the top gate type TFT) 10803 and an upper electrode 10804.

The liquid crystal module as in this embodiment is a system panel in which the liquid crystal panel itself has a built-in image sensor and it can be said that the liquid crystal module has such a structure that the effect of the present invention can be shown more remarkably. In this case, it is also effective to incorporate a control circuit for controlling the image sensor 10801 into the IC chips 110 and 111.

Embodiment 13

This embodiment shows an example in which a reverse stagger type TFT is used as a switching element in a part of a liquid crystal module having the structure shown in the embodiment 12. An image sensor is constituted by a reverse stagger type TFT portion and a photoelectric conversion portion.

If the structure as in the present invention is adopted, it is possible to realize a system panel in which a liquid crystal panel itself has a built-in image sensor, so that the effect of the present invention can be shown more remarkably. In this case, it is also effective to incorporate a control circuit for controlling the image sensor into an IC chip.

Embodiment 14

The present invention can be applied to an EL display device using an EL material (organic EL, inorganic EL) as an electrooptical modulating layer. Since the EL display device is a self luminescence type device, it has advantages such as high brightness and a high field angle, and is suitable for the use of a direct view type display.

Since an object of the present invention is to improve portability and functionality of an electrooptical device and an electronic equipment using the electrooptical device, when the present invention is applied to the direct view type display, a remarkable effect can be obtained.

Embodiment 15

Figure 14:
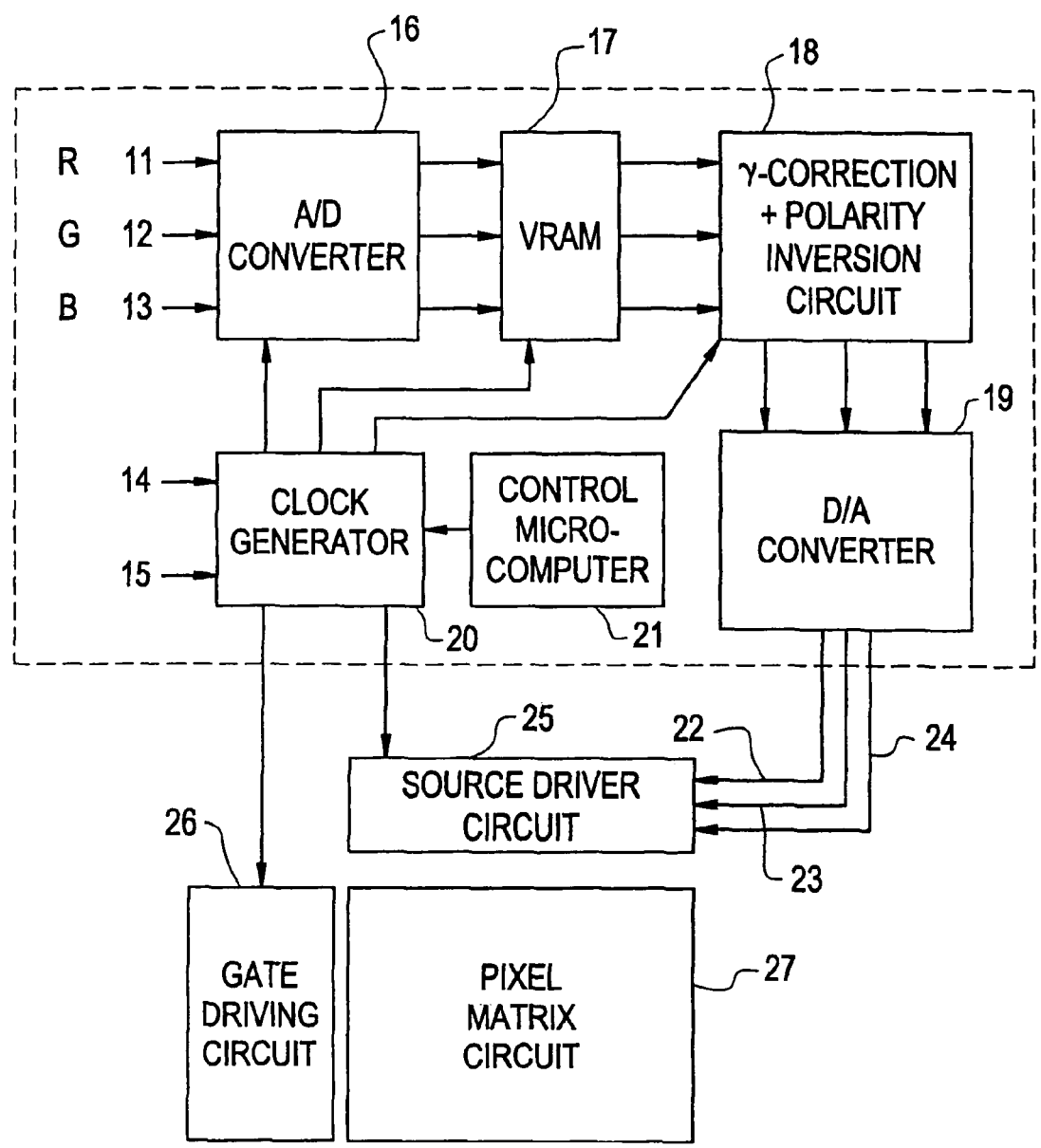
FIG. 14 is an enlarged view showing a circuit constituting a liquid crystal module in Embodiment 15.

In this embodiment, an example of a structure of an IC chip in the liquid crystal module having the structure shown in the embodiments 1 to 13 and in the EL display device shown in the embodiment 14 will be described with reference to a block diagram shown in FIG. 14. A region surrounded by a dotted line is a system structure of the IC chip. Moreover, this embodiment shows an example of a circuit in which after an analog signal is digital processed, it is converted into an analog signal and is transmitted to a liquid crystal panel.

Analog signals transmitted from the outside are an R signal 11, a G signal 12, a B signal 13, a horizontal synchronization signal 14, and a vertical synchronization signal 15. The RGB signals 11 to 13 pass through an A/D converter 16, a VRAM 17 (performing extension of a time axis), a γ correction+polarity inversion circuit 18, and a D/A converter 19, and are outputted as analog signals.

During that, a clock pulse and a start pulse corresponding to XGA, SXGA and the like are formed in a clock generator 20 on the basis of the horizontal synchronization signal 14 and the vertical synchronization signal 15, and are sent to the A/D converter 16, the VRAM 17 (performing extension of a time axis), the γ correction+polarity inversion circuit 18 and the like. The clock generator 20 is controlled by a control microcomputer 21.

In this way, an R signal 22, a G signal 23, and a B signal 24 as analog signals in which a necessary process has been ended, are outputted. A source driving circuit 25, a gate driving circuit 26, and a pixel matrix circuit 27 are formed of TFTs in the liquid crystal panel. The foregoing R signal 22, G signal 23, and B signal 24 are transmitted to the source driving circuit 25.

Incidentally, the TFT in this embodiment includes both a top gate type TFT and a bottom gate type TFT.

Embodiment 16

Figure 15:
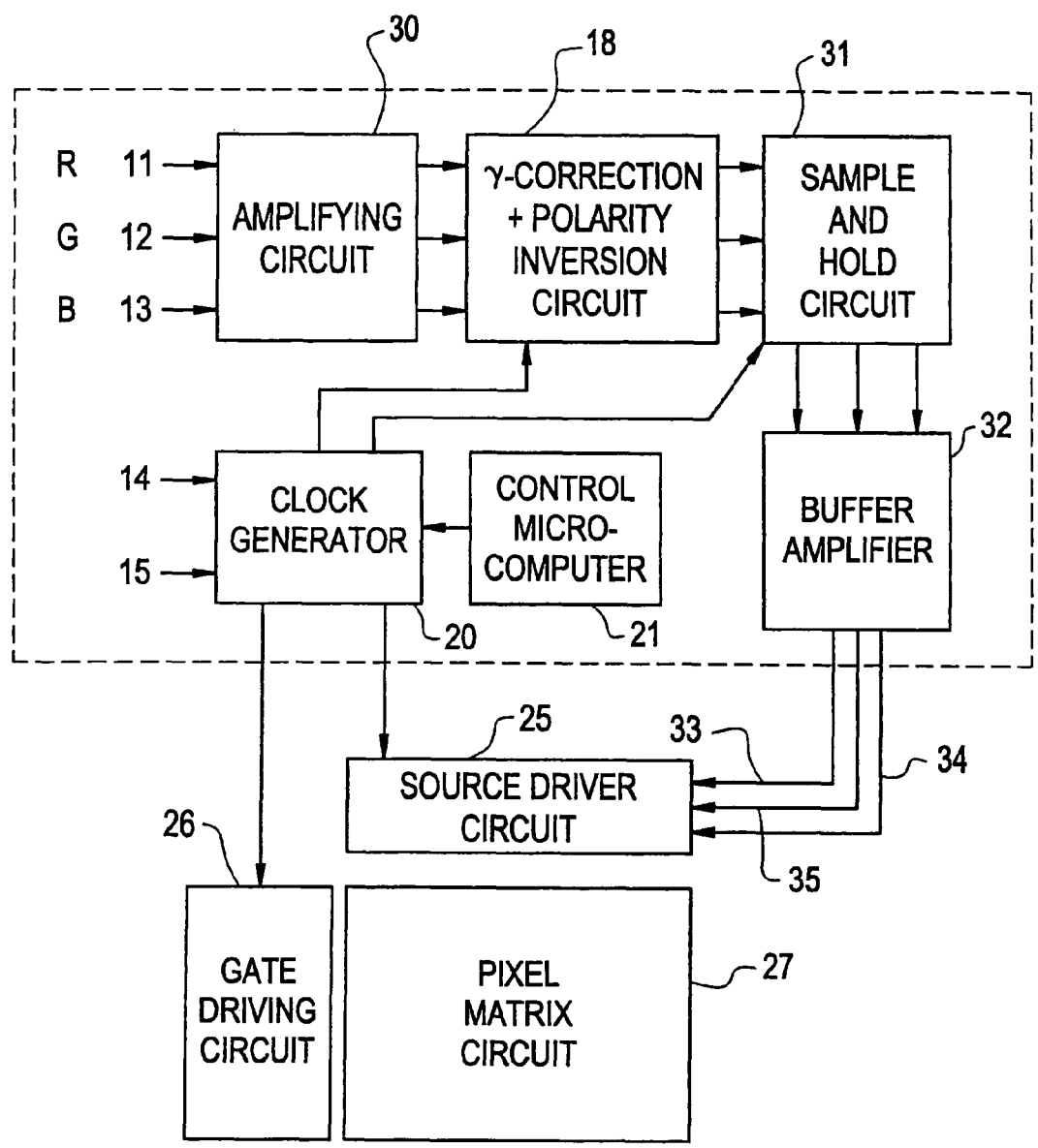
FIG. 15 is a view showing a system structure of a liquid crystal module in Embodiment 16.

In this embodiment, an example of a structure of an IC chip in the liquid crystal module having the structure shown in the embodiments 1 to 13 and in the EL display device shown in the embodiment 14 will be described with reference to a block diagram shown in FIG. 15. This embodiment shows an example in which an analog signal is directly transmitted to a liquid crystal panel.

Since the basic structure has already been described in the embodiment 15, only points different from the embodiment 15 will be described.

Analog signals (R signal 11, G signal 12, and B signal 13) transmitted from the outside pass through an amplifying circuit 30, a γ correction+polarity inversion circuit 18, a sample-and-hold circuit 31, and a buffer amplifier 32, and are outputted. In this way, an R signal 33, a G signal 34, and a B signal 35 as analog signals in which a necessary process has been completed, are outputted. These signals are transmitted to a source driving circuit 25.

Embodiment 17

Figure 16:
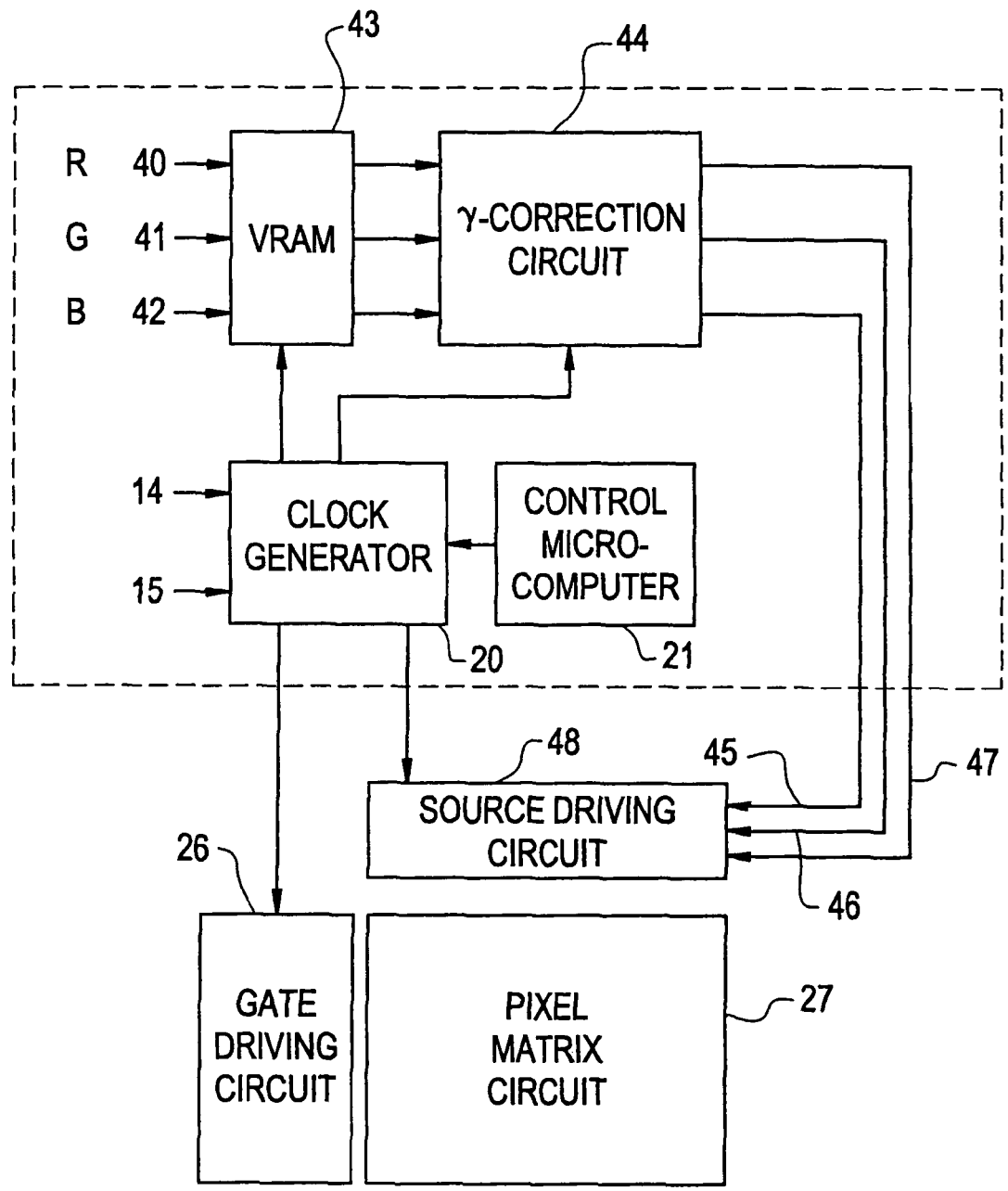
FIG. 16 is a view showing a system structure of a liquid crystal module in Embodiment 17.

In this embodiment, an example of a structure of an IC chip in the liquid crystal module having the structure shown in the embodiments 1 to 13 and in the EL display device shown in the embodiment 14 will be described with reference to a block diagram shown in FIG. 16. This embodiment shows an example in which a digital signal is directly transmitted to a liquid crystal panel.

An R signal 40, a G signal 41, and a B signal 42 are digital signals corresponding to, for example, 6 to 8 bits. The RGB signals 40 to 42 are subjected to a necessary process in a VRAM 43 and a γ correction circuit 44, are converted into an R signal 45, a G signal 46, and a B signal 47, and are transmitted to a source driving circuit 48. In the case of this embodiment, it is necessary to make the source driving circuit 48 a circuit structure corresponding to digital signals.

Embodiment 18

In this embodiment, an example of a structure of an IC chip in the liquid crystal module having the structure shown in the embodiments 1 to 13 and in the EL display device shown in the embodiment 14 will be described with reference to a block diagram shown in FIG. 17. This embodiment shows an example in which a digital signal is temporarily subjected to an arithmetic process and is transmitted to a liquid crystal panel.

Since the basic structure has already been described in the embodiment 17, in this embodiment, explanation will be made while paying attention to only different points.

Digitized RGB signals 40 to 42 are subjected to a correction operation process in a DSP (digital signal processor) 50. At this time, the correction data are stored in a flash memory 51 and are read as required.

The video signals subjected to the correction operation are processed by a VRAM 43 and a γ correction circuit 44, are converted into an R signal 52, a G signal 53, and a B signal 54, and are transmitted to the source driving circuit 48.

Embodiment 19

In this embodiment, a constructive example of a process for forming RGB signals inputted into the system structure shown in the embodiments 15 to 18 will be described with reference to block diagrams shown in FIGS. 18A and 18B. It is possible to mount also a circuit structure of this embodiment on a liquid crystal panel substrate by making the circuit one-chip.

Figure 18A:
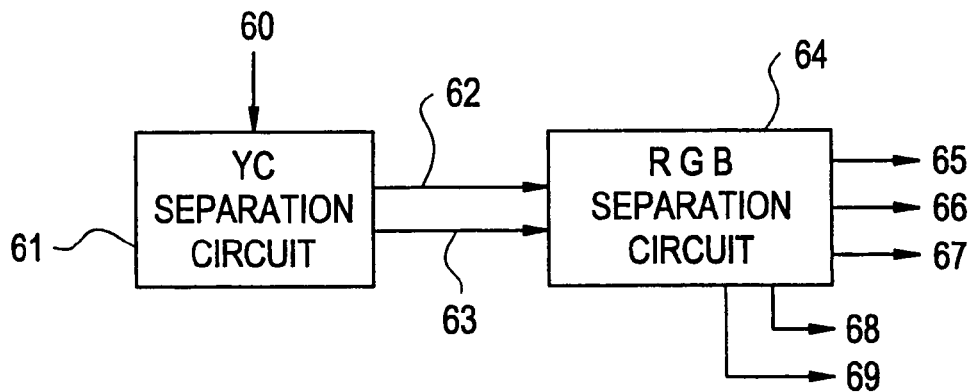
FIGS. 18A and 18B are views respectively showing a system structure of a liquid crystal module in Embodiment 19.

As shown in FIG. 18A, an NTSC signal 60 is separated by a YC separation circuit 61 into a Y (brightness) signal 62 and a C (color) signal 63. Those signals are separated by an RGB separation circuit 64 into an R signal 65, a G signal 66, and a B signal 67. Here, a horizontal synchronization signal 68 and a vertical synchronization signal 69 are formed.

A signal of other TV standard such as a PAL system signal is also processed by a circuit made of a similar structure and is transmitted to a liquid crystal panel.

Figure 18B:
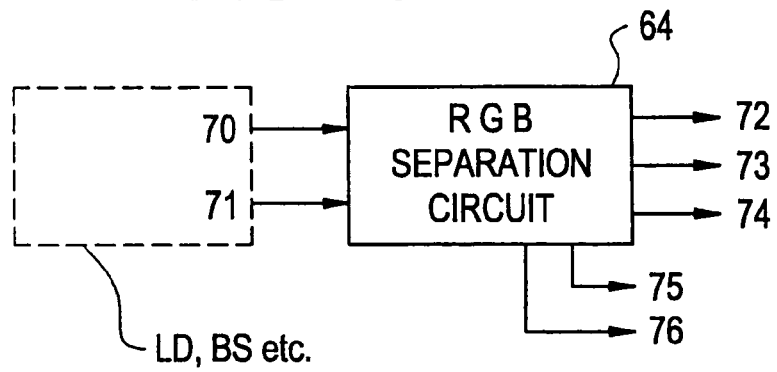

As shown in FIG. 18B, signals from a laser disc or BS (satellite broadcasting) are transmitted as a Y (brightness)

signal 70 and a C (color) signal 71. These are processed by the RGB separation circuit 64 to separate the signals into an R signal 72, a G signal 73, and a B signal 74. Besides, a horizontal synchronization signal 75 and a vertical synchronization signal 76 are also formed.

These RGB signals, and horizontal and vertical synchronization signals are transmitted to the respective system circuits shown in the embodiments 15 to 18, are transmitted to the driving circuit of the liquid crystal panel, and are restored as a picture by the pixel matrix circuit.

Embodiment 20

Figure 19:
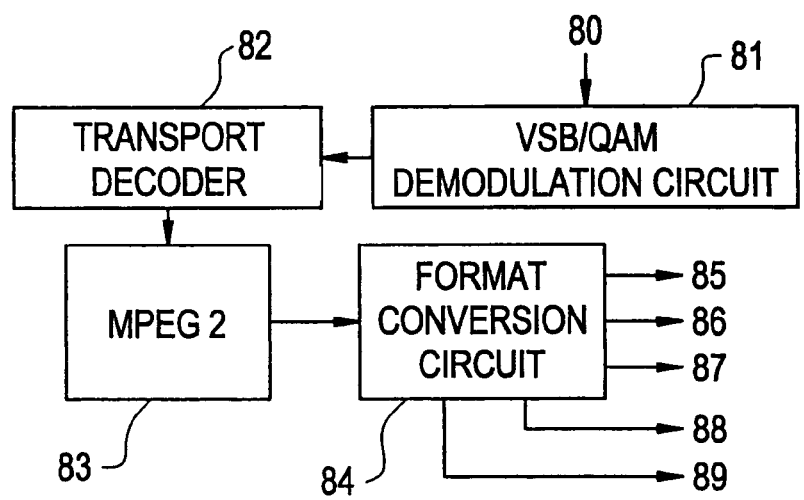
FIG. 19 is a view showing a system structure of a liquid crystal module in Embodiment 20.

In this embodiment, a constructive example of a process for forming RGB signals inputted into the system structure shown in the embodiments 15 to 18 will be described with reference to a block diagram shown in FIG. 19. In this embodiment, which the embodiment 19, an example of circuit structure corresponding to digital broadcasting in U.S. and the like (corresponding to ATV) will be described.

A video signal 80 is a signal obtained by applying various frequency conversion processes to a video signal received from an antenna. This signal is modulated to the original frequency by a VSB (or QAM) demodulation circuit 81. Then, the signal is restored to a coded signal by a transport decoder 82.

The thus processed signal is inputted into an MPEG2 (decoder) 83, and a frequency band is expanded. The signal is converted into a desired format signal by a format conversion circuit 84, and further, an R signal 85, a G signal 86, a B signal 87, a horizontal synchronization signal 88, and a vertical synchronization signal 89 are formed.

Since digital signals are processed up to here, in the case where an analog signal is finally desired, it is appropriate that a D/A converter (not shown) is disposed after the format conversion circuit 84.

The video signal obtained in the manner described above is processed by the system shown in the embodiments 15 to 18. The process so far is carried out in the IC chip, and it is appropriate that the video signal processed in the IC chip is transmitted to the source/gate driving circuits formed of TFTs on the substrate.

Incidentally, the TFT in this embodiment includes both a top gate type TFT and a bottom gate type TFT.

Embodiment 21

In this embodiment, a manufacturing step (multifaced production step) in the case where a plurality of liquid crystal panels are produced from a large substrate, will be described with reference to FIG. 20. In this embodiment, a case where four liquid crystal panels are manufactured from a large square substrate is given as an example.

Figure 20A:
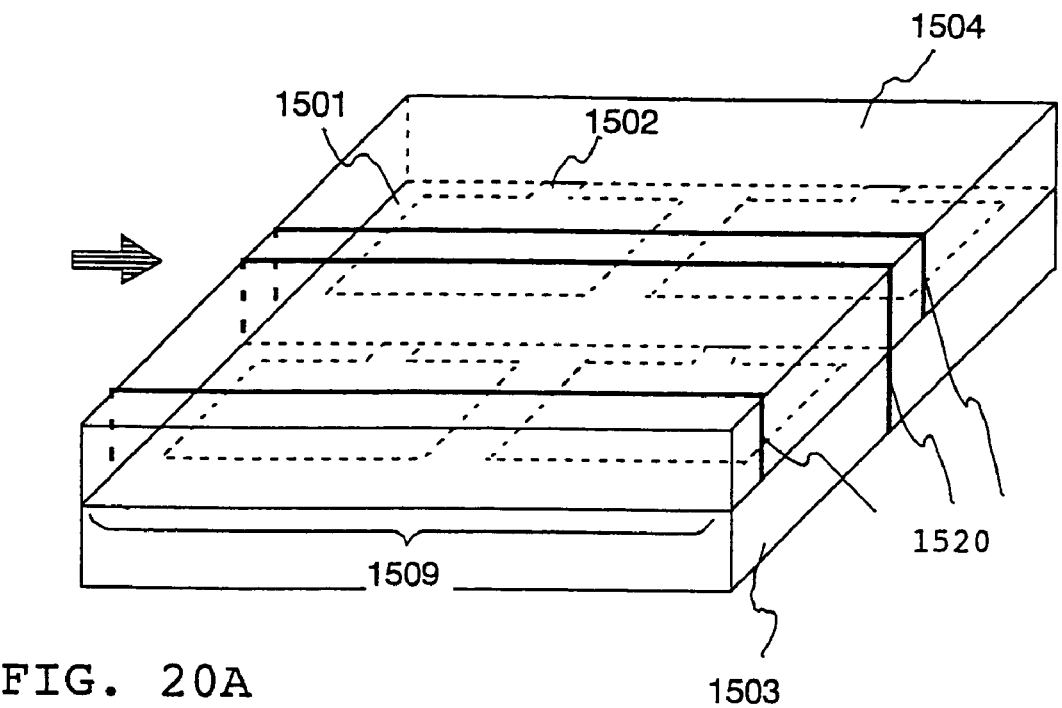
FIGS. 20A to 20C are views respectively showing a system structure of a liquid crystal module in Embodiment 21.

FIG. 20A shows a step of dividing large substrates of the same size, bonded to each other in a cell assembling step. In FIG. 20A, 1501 denotes a seal material (sealing material), and a liquid crystal material is sealed inside of the enclosure of the sealing material. In this embodiment, first, as shown in FIG. 20A, the surface on which a liquid crystal injection port 1502 is formed, is divided into parts by a scriber.

The scriber is a device in which after a thin groove (scribe groove) is formed in a substrate, a small impact is given to the substrate to generate a break (crack) along the groove so that the substrate is divided into parts.

Other than the scriber, a dicer is known as a device of cutting a substrate. The dicer is a device in which a hard cutter (dicing saw) is made to rotate at a high speed to divide a substrate into parts. However, since it is necessary to sprinkle a large amount of water when using the dicer in order to suppress heat and polishing powder, the dicer can not be used in the state of FIG. 20A in which the liquid crystal injection port is open, because water enters the liquid crystal injection port.

In the step of FIG. 20A, since the scribe groove is formed in the vicinity of the surface of the substrate, scribe grooves are formed in the side of the first substrate (substrate at the side where TFTs are manufactured) 1503 and the side of the second substrate (opposite side substrate) 1504 to divide the substrates into parts. This situation will be described with reference to FIGS. 20B and 20C.

Figure 20B:
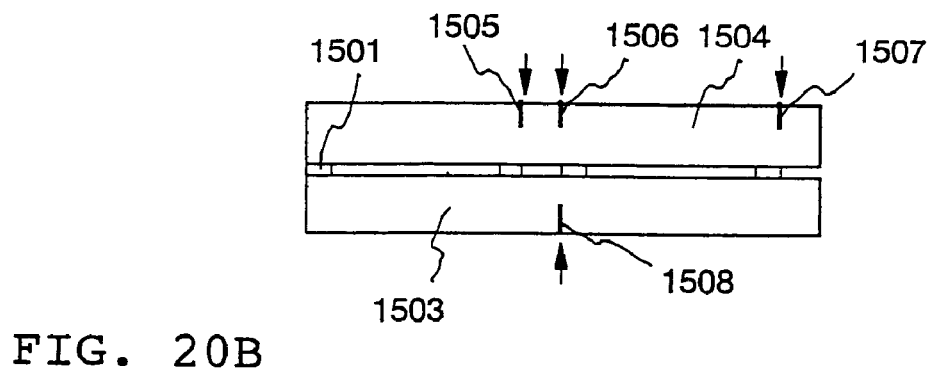

FIG. 20B is a view of FIG. 20A seen in the direction indicated by an arrow. First, in FIG. 20B, as indicated by arrows, scribe grooves 1505 to 1508 are formed from both sides of the first substrate 1503 and the second substrate 1504.

At this time, as shown in FIG. 20B, the scribe groove 1508 formed in the first substrate 1503 and the scribe groove 1506 formed in the second substrate 1504 are aligned to each other. Thus, the structure of the present invention (structure in which edges are trued up each other) can be realized.

At this time, the scribe grooves 1505 and 1507 are formed only in the second substrate 1504. Thus, it is possible to partially remove only a part of the second substrate 1504. By this, a part of the first substrate 1503 is exposed. Cutting lines by the scriber are denoted by 1520.

Figure 20C:
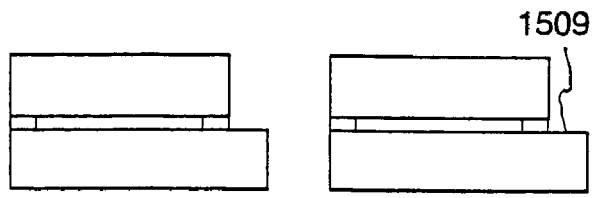

After the formation of the scribe grooves in the manner described above is completed, cutting is made the substrate to divide into parts so that the state shown in FIG. 20C is obtained. A portion 1509 where the first substrate 1503 is exposed as described above is utilized as a portion to which an FPC and an IC chip are attached.

When the edges at the side where the liquid crystal injection port 1502 is formed are trued up each other between the first substrate and the second substrate as in the present embodiment, the manufacturing cost can be decreased. This is because, if the edges are trued up each other, such a state can be attained that the liquid crystal injection port is brought into contact just with the surface of a liquid crystal in a subsequent liquid crystal injection step, so that the height of the liquid level of the liquid crystal prepared can be suppressed to the minimum. That is, since the liquid crystal can be effectively used, which greatly contributes to lowering of cost.

In this way, the large substrate is divided into three substrates in which three liquid crystal panels are made one set. Next, injection and sealing steps of a liquid crystal material are carried out for each of these three substrates. Since these steps may follow well-known steps can be adopted as such steps, the explanation will be omitted.

At this time, it is possible to inject a liquid crystal material to the three liquid crystal panels at the same time. Of course, it is also possible to inject the liquid crystal material to nine liquid crystal panels at the same time by concurrently making the three substrates subjected to batch processing.

Figure 21:
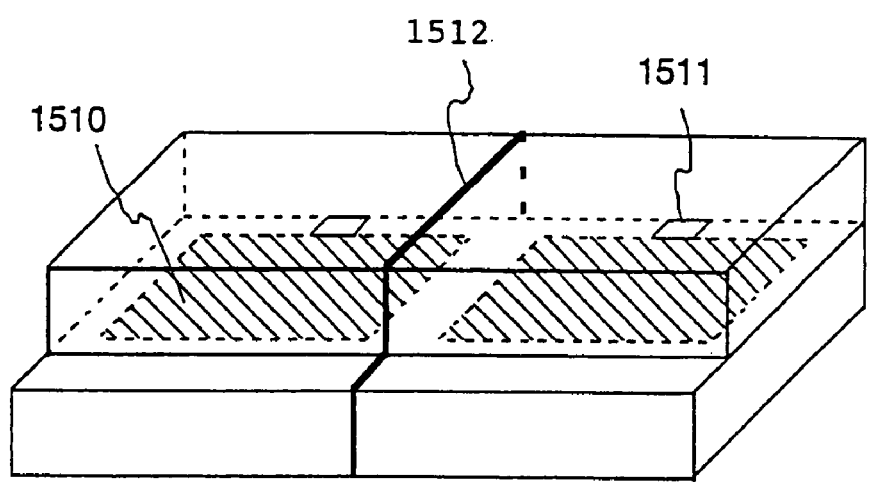
FIG. 21 is a view for explaining a dividing step at multi-faced production in Embodiment 21.

In the manner described above, after the injection step of the liquid crystal material and the sealing step of a sealing material are completed the substrate is divided into parts by a dicer along the direction of a broken line as shown in FIG. 21. The cutting line by the dicer is denoted by 1512. The reason why a liquid crystal material 1510 is sealed prior to this step is to make the dicer usable in this dividing step. Incidentally, reference numeral 1507 denotes a sealing material for sealing the liquid crystal material.

There are advantages of using the dicer, such that dividing errors are fewer than the scriber so that the yield is high, and that since the first substrate and the second substrate can be divided into parts at the same time, the throughput can be improved.

In this way, nine liquid crystal panels are respectively obtained by the dividing step shown in FIG. 20B. Since this dividing step may be carried out by the dicer at the same time, there is no troublesomeness unlike the scriber by which scribing must be made from both sides of a substrate.

Since, in the present invention, edges of the first substrate and edges of the second substrate are trued up each other at all edges except an edge which is adjacent to the portion where an IC chip is attached, the dividing step of the liquid crystal panel is completed at the same time as dividing shown in FIG. 21.

Although dividing by the scriber and dividing by the dicer are selectively used in the dividing step in this embodiment, cares as set forth below must be paid to the way of selection.

First, in the case where the scriber is used, since a crack is generated by giving an impact to a scribe groove and a substrate is divided into parts along the crack, stress is apt to be applied to a circuit element (TFT, etc.) formed on the substrate at the time of dividing. Since the stress applied to the circuit element may cause deterioration of characteristics of the element, it is not preferable.

Thus, in the case where a circuit requiring a high operating speed is constructed in the vicinity of a divided surface, since stress has a very bad influence, it is preferable to avoid dividing by the scriber and to carry out dividing by the dicer. In other words, it is desirable that in the case where dividing is carried out in the vicinity of a circuit susceptible to an influence of stress, the dicer should be used if possible, and only in the case where dividing is carried out in the vicinity of a circuit which does not receive an influence of stress very much, the scriber is used.

For example, if a driving circuit formed by TFTs on a substrate is covered with a liquid crystal material, it does not easily receive stress. Thus, in the case where a driving circuit is formed in the region surrounded by a sealing material for sealing a liquid crystal, even if the scriber is used, the stress is not easily transferred. If the dicer is used, even if such a structure is adopted that a liquid crystal layer is arranged only on a pixel matrix circuit and the liquid crystal layer does not exist on a driving circuit, stress at dividing is not easily applied.

As described above, it is very effective to selectively use dividing by the scriber and dividing by the dicer according to what circuit is disposed in the vicinity of the substrate surface to be divided. In the case where the scriber and dicer are selectively used as in this embodiment, such cares have a very important meaning.

Incidentally, the TFT in this embodiment includes both a top gate type TFT and a bottom gate type TFT.

Embodiment 22

The liquid crystal module of the present invention can be used as a display for various electric equipments. The electric equipment cited in this embodiment is defined as a product incorporating an electrooptical device typified by a liquid crystal module.

Such an electric equipment includes a video camera, a still camera, a projector, a projection TV, a head mount display, a car navigation system, a personal computer, a portable information terminal (mobile computer, portable telephone, etc.), and the like. An example is shown in FIG. 22.

FIG. 22A shows a portable telephone which is constituted by a main body 2001, an audio output portion 2002, an audio input portion 2003, a display device 2004, an operation switch 2005, and an antenna 2006. The present invention can be applied to the display device 2004 and the like.

FIG. 22B shows a video camera which is constituted by a main body 2101, a display device 2102, an audio input portion 2103, an operation switch 2104, a battery 2105, and an image receiving portion 2106. The present invention can be applied to the display device 2102.

FIG. 22C shows a mobile computer which is constituted by a main body 2201, a camera portion 2202, an image receiving portion 2203, an operation switch 2204, and a display device 2205. The present invention can be applied to the display device 2205 and the like.

FIG. 22D shows a head mount display which is constituted by a main body 2301, a display device 2302, and a band portion 2303. The present invention can be applied to the display device 2302.

FIG. 22E shows a rear type projector which is constituted by a main body 2401, a light source 2402, a display device 2403, a polarizing beam splitter 2404, reflectors 2405 and 2406, and a screen 2407. The present invention can be applied to the display device 2403.

FIG. 22F shows a front type projector which is constituted by a main body 2501, a light source 2502, a display device 2503, an optical system 2504, and a screen 2505. The present invention can be applied to the display device 2503.

As described above, the scope of application of the present invention is very wide, and can be applied to an electric equipment of any field. Especially, it can be said that the present invention is very effective for an electric equipment that gives priority to portability.

For example, since various kinds of signal processing can be carried out by an IC chip, almost all functions of an electric equipment are practically performed only by a liquid crystal module. That is, an electric equipment such as a card type mobile computer can also be realized.

In the present invention, since a substrate at a side where a TFT is manufactured and an opposite substrate are bonded to each other in such a manner that the edges thereof are made as flush as possible, and an IC chip is attached to an FPC attaching portion, it is possible to constitute a very compact liquid crystal module.

Thus, since an IC chip integration type system panel can be realized with a minimum size, it is possible to realize a liquid crystal module which is very compact and has multifunctionality. This directly contributes to miniaturization and lightening (improvement in portability) of an electric equipment.

In the case where a pixel matrix circuit and a driving circuit are constituted by bottom gate type TFTs (especially, reverse stagger type TFTs), since they can be formed at a low manufacturing cost, it is expected that the cost of the liquid crystal module can be lowered, and further, the cost of the electric equipment can be lowered.

What is claimed is:
1. A display device comprising:
   a substrate;
   a pixel matrix circuit formed over the substrate;
   a driving circuit formed over the substrate, the driving circuit operationally connected to the pixel matrix circuit; and
   an integrated circuit over the substrate and comprising a demodulation circuit, a transport decoder operationally connected to the demodulation circuit, an MPEG 2 decoder operationally connected to the transport decoder, a format conversion circuit operationally con- nected to the MPEG 2 decoder and a D/A converter operationally connected to the format conversion circuit; and a flexible print circuit connected to the substrate, wherein each of the pixel matrix circuit and the driving circuit comprises a plurality of thin film transistors formed over the substrate and each of the plurality of thin film transistors has a channel formation region comprising crystalline silicon.

2. The display device according to claim 1 wherein the display device is a liquid crystal display device.

3. The display device according to claim 1 wherein each of the plurality of thin film transistors has a top gate thin film transistor.

4. The display device according to claim 1 wherein each of the plurality of thin film transistors has a bottom gate thin film transistor.

5. The display device according to claim 1 wherein the integrated circuit corresponds to digital broadcasting.

6. The display device according to claim 1 wherein the integrated circuit is formed of MOS FETs using single crystal bulk silicon.

7. The display device according to claim 1 wherein the integrated circuit has an SOI structure.

8. The display device according to claim 1 wherein the integrated circuit is located adjacent to the flexible print circuit.

9. A display device comprising:

a substrate;

a pixel matrix circuit comprising a plurality of thin film transistors formed over the substrate;

a driving circuit operationally connected to the pixel matrix circuit; and an integrated circuit comprising a demodulation circuit, a transport decoder operationally connected to the demodulation circuit, an MPEG 2 decoder operationally connected to the transport decoder, a format conversion circuit operationally connected to the MPEG 2 decoder and a D/A converter operationally connected to the format conversion circuit.

10. The display device according to claim 9 wherein the display device is a liquid crystal display device.

11. The display device according to claim 9 wherein each of the plurality of thin film transistors has a top gate thin film transistor.

12. The display device according to claim 9 wherein each of the plurality of thin film transistors has a bottom gate thin film transistor.

13. The display device according to claim 9 wherein the integrated circuit corresponds to digital broadcasting.

14. The display device according to claim 9 wherein the integrated circuit is formed of MOS FETs using single crystal bulk silicon.

15. The display device according to claim 9 wherein the integrated circuit has an SOI structure.

16. The display device according to claim 9 wherein the driving circuit is formed over the substrate.

17. A display device comprising:

a substrate;

a pixel matrix circuit comprising a plurality of thin film transistors formed over the substrate;

a driving circuit operationally connected to the pixel matrix circuit; and an integrated circuit over the substrate and comprising a demodulation circuit, a transport decoder operationally connected to the demodulation circuit, an MPEG 2 decoder operationally connected to the transport decoder, a format conversion circuit operationally connected to the MPEG 2 decoder and a D/A converter operationally connected to the format conversion circuit; and a flexible print circuit connected to the substrate.

18. The display device according to claim 17 wherein the display device is a liquid crystal display device.

19. The display device according to claim 17 wherein each of the plurality of thin film transistors has a top gate thin film transistor.

20. The display device according to claim 17 wherein each of the plurality of thin film transistors has a bottom gate thin film transistor.

21. The display device according to claim 17 wherein the integrated circuit corresponds to digital broadcasting.

22. The display device according to claim 17 wherein the integrated circuit is formed of MOS FETs using single crystal bulk silicon.

23. The display device according to claim 17 wherein the integrated circuit has an SOI structure.

24. The display device according to claim 17 wherein the driving circuit is formed over the substrate.

25. The display device according to claim 17 wherein the integrated circuit is located adjacent to the flexible print circuit.

26. A display device comprising:

a substrate;

a pixel matrix circuit formed over the substrate;

a driving circuit operationally connected to the pixel matrix circuit; and an integrated circuit comprising a demodulation circuit, a transport decoder operationally connected to the demodulation circuit, an MPEG 2 decoder operationally connected to the transport decoder, a format conversion circuit operationally connected to the MPEG 2 decoder and a D/A converter operationally connected to the format conversion circuit, wherein each of the pixel matrix circuit and the driving circuit comprises a plurality of thin film transistors formed over the substrate and each of the plurality of thin film transistors has a channel formation region comprising crystalline silicon.

27. The display device according to claim 26 wherein the display device is a liquid crystal display device.

28. The display device according to claim 26 wherein each of the plurality of thin film transistors has a top gate thin film transistor.

29. The display device according to claim 26 wherein each of the plurality of thin film transistors has a bottom gate thin film transistor.

30. The display device according to claim 26 wherein the integrated circuit corresponds to digital broadcasting.

31. The display device according to claim 26 wherein the integrated circuit is formed of MOS FETs using single crystal bulk silicon.

32. The display device according to claim 26 wherein the integrated circuit has an SOI structure.

* * * * *